(12) United States Patent
Kobayashi et al.

(10) Patent No.: US 6,367,266 B1
(45) Date of Patent: *Apr. 9, 2002

(54) HEAT INSULATION CHAMBER, THERMOSTATIC CHAMBER AND CRYOSTAT

(75) Inventors: Kazuhiko Kobayashi, Kawasaki; Kazunori Yamanaka; Akihiko Akasegawa, both of Isehara; Yoshiharu Tozawa, Kawasaki; Fumihiko Kobayashi, Yokosuka; Ichiro Abeno, Nasu-gun, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,801

(22) Filed: Jul. 28, 1999

(30) Foreign Application Priority Data

Oct. 7, 1998 (JP) .......................................... 10-285489

(51) Int. Cl.[7] ............................ F25B 19/00; H01Q 1/00; H04B 1/03; H04B 5/00
(52) U.S. Cl. ........................ 62/51.1; 62/259.2; 343/720; 455/41; 361/814
(58) Field of Search .............................. 62/259.2, 51.1; 361/814; 343/720, 713; 455/41

(56) References Cited

U.S. PATENT DOCUMENTS 5,155,494 A * 10/1992 Bryant et al. ............... 343/713
5,323,293 A    6/1994 Angiulli et al.
5,543,386 A    8/1996 Findikoglu et al.
5,600,333 A *  2/1997 Justice et al. ............... 343/713
5,612,652 A *  3/1997 Crosby ........................ 343/713
5,877,703 A *  3/1999 Bloss et al. ............. 340/870.02
5,950,444 A *  9/1999 Matsunaga ................. 62/259.2

FOREIGN PATENT DOCUMENTS

JP           8-008623         1/1996

* cited by examiner

Primary Examiner—William Doerrler
(74) Attorney, Agent, or Firm—Rosenman & Colin LLP

(57) ABSTRACT

A heat insulation chamber according to the present invention is a heat insulation chamber which is made of heat insulating material and forms an inner chamber for accommodating an electronic part.

This heat insulation chamber achieves coupling between the electronic part accommodated in the inner chamber formed within a cabinet and the outside of the cabinet by a radio transmission path or a coupling path by static coupling or inductive coupling.

A thermostatic chamber and a cryostat according to the present invention comprise the aforementioned heat insulation chamber, a heat exchanger mounted in the heat insulation chamber, and a thermoregulator which maintains the temperature of the inner chamber accommodating the electronic part at an operating temperature of the electronic part through the heat exchanger.

Equipments which adopt any heat insulation chambers, thermostatic chambers, or cryostats can be maintained so to have desired characteristics in a stable condition and accurately with their physical size kept from increasing greatly.

16 Claims, 17 Drawing Sheets

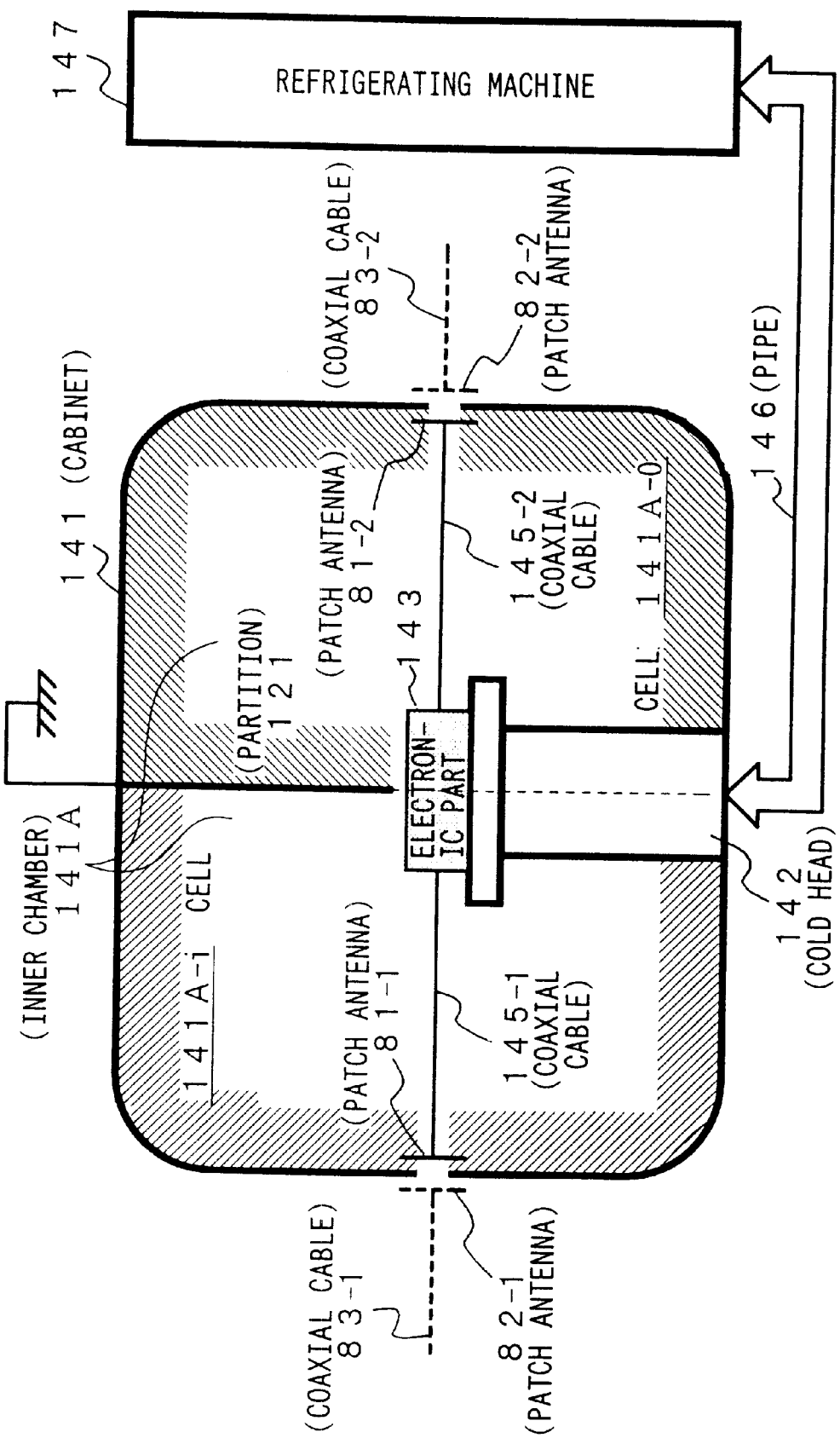

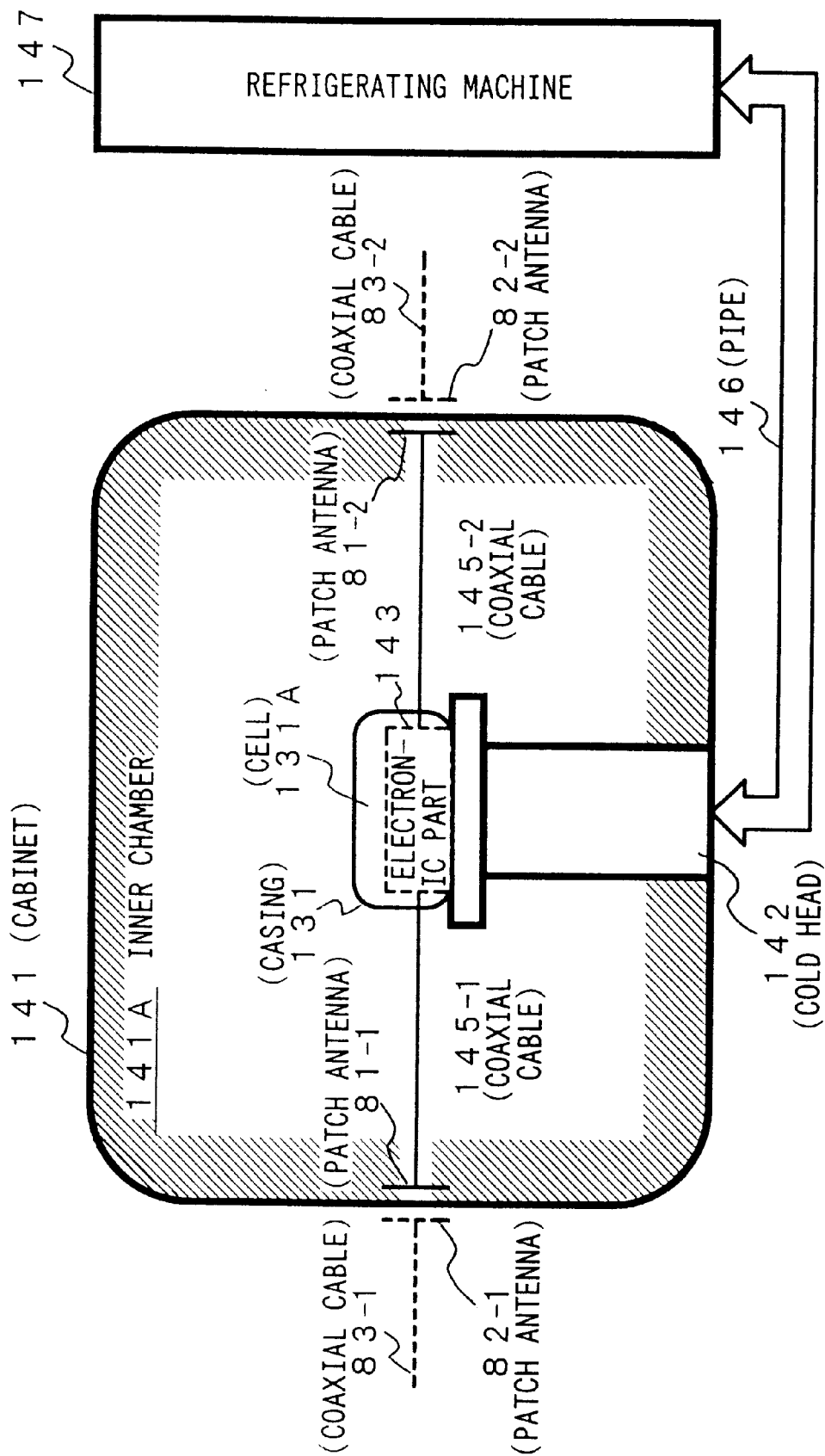

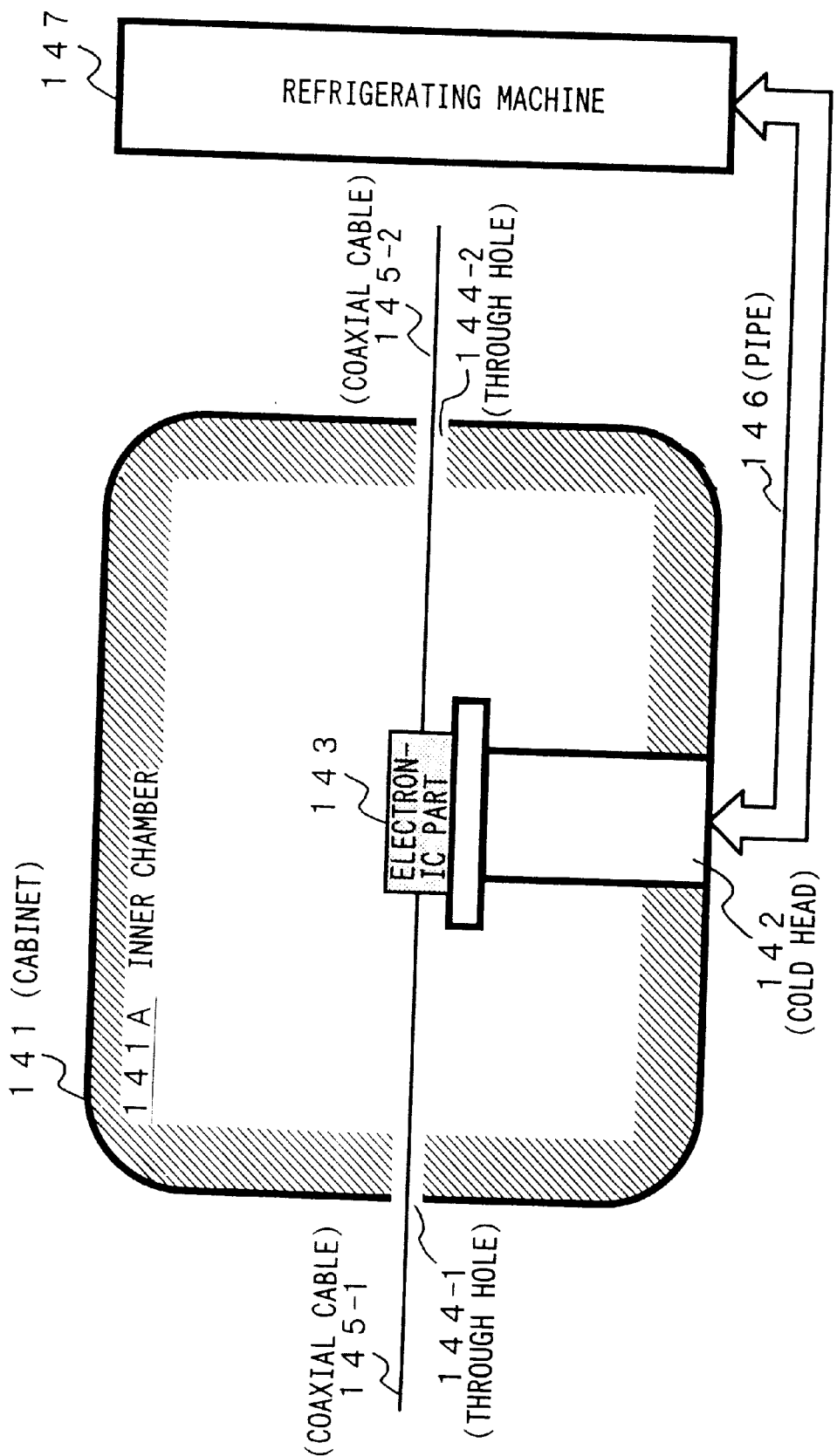
PRIOR ART FIG. 16

HEAT INSULATION CHAMBER, THERMOSTATIC CHAMBER AND CRYOSTAT

BACKGROUND OF THE INVENTION

1. Field of the Invention

The present invention relates to a heat insulation chamber which is made of heat insulating material and forms an inner chamber for storing an electronic part, and a thermostatic chamber and a cryostat to which the heat insulation chamber is applied.

2. Description of the Related Art

In recent years, many electronic equipments, which are required to have high performance and reliability, are mounted with a thermostatic chamber which accommodates an device applied in order to obtain a stable operating environment with high reliability, has a loose thermal coupling to the outside, and maintains the operating temperature of the device in a desired range.

Also, in recent years, telecommunication technology has progressed remarkably, and to the main part of communication equipment which configures the communication system, minimizing insertion losses and improving noise figures is severely required.

However, the minimization of insertion losses and the improvement of noise figures can be achieved by applying a superconductive filter and a low noise amplifier (LNA) operating at a cryogenic temperature. Therefore, many communication equipments are provided with cryostats for maintaining in a stable condition of an operating temperature of superconductive filters and low noise amplifiers. Such electronic parts are configured of, for example, HEMT or the like.

FIG. 16 is a diagram showing an exemplary configuration of a conventional cryostat.

In the drawing, a cold head 142 is attached to the bottom of a box-like cabinet 141 which is made of heat insulating material, and an electronic part 143, which operates at a cryogenic temperature, is mounted on the top of the cold head 142. Respective through holes 144-1 and 144-2 are formed among the side walls of the cabinet 141, which faces the input and output terminals of the electronic part 143. Respective ends of coaxial cables 145-1 and 145-2 are connected to these input and output terminals. These coaxial cables 145-1 and 145-2 are led to the outside of the cabinet 141 through the through holes 144-1 and 144-2, which are then sealed with the interior of the cabinet 141 maintained under vacuum. The cold head 142 is connected to a refrigerating machine 147 through a pipe 146.

In the cryostat configured as described above, the cold head 142 maintains the temperature of an inner chamber (hereinafter indicated with reference number "141A" allotted), which is sandwiched between the electronic part 143 and the interior walls of the cabinet 141, at a cryogenic temperature that the electronic part 143 operates at, by liquid helium circulating through the pipe 146 as a heating medium between the cold head 142 and the refrigerating machine 147.

The electronic part 143 receives input signals given from a circuit disposed outside of the cabinet 141 through the coaxial cable 145-1, performs a predetermined operation (e.g., filtering as the superconductive filter and amplifying as the low noise amplifier as described above) to the input signals to generate output signals and feeds the output signals to a circuit connected through the coaxial cable 145-2.

In other words, the operating temperature of the electronic part 143 is maintained at a desired cryogenic temperature under the temperature control by the refrigerating machine 147, the pipe 146, and the cold head 142, so that the electronic part 143 exhibits predetermined characteristics and performance under the operating temperature and operates in cooperation with the circuit disposed outside of the cabinet 141 as described above.

In the conventional case described above, the coaxial cables 145-1 and 145-2 are not only conductors but also heat conductors. Therefore, the refrigerating machine 147 unnecessarily consumed a large quantity of electric power to keep the operating temperature of the electronic part 143 from rising by absorbing heat flowing from the outside of the cabinet 141 into the input and output terminals of the electronic part 143 through the coaxial cables 145-1, 145-2.

Technologies for decreasing heat quantity of heat flowing in from the outside as described above include, for example, a technology which uses a conductor with a low thermal conductivity for the inner conductor and outer conductor of the coaxial cables 145-1 and 145-2 and a technology which sets the cross section of the inner conductor and outer conductor to a small value. But, none of such technologies have actually been used because insertion losses of the coaxial cables 145-1 and 145-2 increased to an intolerable level.

And, when the quantity of heat flowing in from the outside through the coaxial cables 145-1 and 145-2 is large, either the operating temperature of the electronic part 143 is not secured, or it is necessary to use a refrigerating machine having higher performance as the refrigerating machine 147.

Moreover, in connecting the coaxial cables 145-1 and 145-2 with the input and output terminals of the electronic part 143, they are generally soldered directly, or, each plug previously fitted to the coaxial cables 145-1 and 145-2 is engaged to each receptacle which is previously soldered to the electronic part 143.

However, the thermal expansion coefficients of the input and output terminals of the electronic part 143 and the receptacles or the coaxial cables 145-1 and 145-2 are generally considerably different.

Therefore, there has been a possibility of a disconnection or an unnecessary increase insertion losses between the coaxial cables 145-1 and 145-2 and the input and output terminals of the electronic part 143 during a large change in the temperature of the inner chamber 141A such as at the moment of activating or stopping.

SUMMARY OF THE INVENTION

It is an object of the present invention to provide a heat insulation chamber, a thermostatic chamber, and a cryostat which maintain the operating temperature efficiently and also maintain coupling with a circuit disposed outside in a stable condition.

It is also an object of the present invention to improve the performance and reliability of electronic appliances as well as to reduce their costs and dimentions.

The above-described objects are achieved by a heat insulation chamber, which comprises a cabinet which forms an inner chamber for accommodating an electronic part and is made of heat insulating material; and coupling means which is disposed in the inner chamber or the cabinet, connected to the electronic part, and forms a radio transmission path to an antenna disposed outside of the cabinet.

In this heat insulation chamber, the thermal conductivity of the radio transmission path is generally smaller than that of a conductor, so that heat flowing in and out between the outside and the inner chamber is suppressed more than in the prior art. Moreover, an antenna is not disposed in the inner chamber formed by the cabinet.

Therefore, the electronic part of which the operating temperature is maintained in a stable condition and is downsized, allowing the maintenance of high flexibility in arranging the cabinet's inner layout.

And, the above-described objects can be achieved by a heat insulation chamber, which comprises a cabinet which forms an inner chamber for accommodating an electronic part and is made of heat insulating material; an antenna which is disposed in the inner chamber or the cabinet; a feeder which leads the feeding point of the antenna to the outside of the cabinet;

and coupling means which is disposed in the inner chamber or the cabinet, connects the feeding point to the electronic part, and forms a radio transmission path to the antenna.

In this heat insulation chamber, the thermal conductivity of the radio transmission path is generally smaller than that of a conductor, so heat flowing in and out between the outside and the inner chamber is suppressed more than in the prior art. Besides, both the antenna and the coupling means are disposed in the inner chamber formed of the cabinet, so the transfer characteristics of the radio transmission path suddenly or extensively changing hardly happens even when the outside environment of the cabinet changed.

Therefore, the operating temperature and the operating environment of the electronic part are maintained in a stable condition.

The above-described objects can also be achieved by a heat insulation chamber, which comprises a cabinet which forms an inner chamber for accommodating an electronic part and is made of heat insulating material; and coupling means which is disposed in the inner chamber or the cabinet, is connected to the electronic part, and forms a coupling path with a device disposed outside of the cabinet by static coupling and/or inductive coupling.

In such heat insulation chamber, the thermal conductivity of the coupling path is generally considerably smaller than that of a conductor, so heat flowing in and out between the outside and the inner chamber is suppressed more than in the prior art. Besides, the device is not disposed in the inner chamber formed by the cabinet.

Therefore, the electronic part of which the operating temperature is maintained in a stable condition and is downsized, allowing the maintenance of high flexibility in arranging the cabinet's inner layout.

The above-described objects can also be achieved by a heat insulation chamber, which comprises a cabinet which forms an inner chamber for accommodating an electronic part and is made of heat insulating material; a device which is disposed in the inner chamber or the cabinet; a conductor which leads the terminal of the device to the outside of the cabinet; and coupling means which is disposed in the inner chamber or the cabinet, is connected to the electronic part, and forms a coupling path with the device by static coupling and/or inductive coupling.

In this heat insulation chamber, the thermal conductivity of the radio transmission path is generally smaller than that of a conductor, so heat flowing in and out between the outside and the inner chamber is suppressed more than in the prior art. Besides, both the antenna and the coupling means are disposed in the inner chamber formed of the cabinet, so the transfer characteristics of the radio transmission path suddenly or extensively changing hardly happens even when the outside environment of the cabinet changed.

Therefore, the operating temperature and the operating environment of the electronic part are maintained in a stable condition.

Besides, the above-described objects can be achieved by forming a partition between the outside of the cabinet and the inner chamber for accommodating the electronic part and disposing the coupling means together with the electronic part in the inner chamber.

According to such configuration, the coupling means is disposed together with the electronic part in the inner chamber, so the operating temperature of the electronic part is maintained in a stable condition, the mechanical configuration is simplified, and coupling with the electronic part can be made close.

The above-described objects can also be achieved by forming a partition between the outside of the cabinet and the inner chamber for accommodating the electronic part and disposing the coupling means in a region sandwiched between the outer wall of the cabinet and the interior wall of the inner chamber.

According to such configuration, the coupling means is disposed in a region other than the inner chamber but within the outer walls of the cabinet.

Therefore, the radio transmission path or the coupling path is formed between the electronic part and the outside of the cabinet in a stable condition without remarkable or sudden changes in transmission characteristics and transfer characteristics owing to the environment and the medium of the inner chamber where the electronic part is disposed.

Besides, the above-described objects are achieved by forming the inner chamber as an aggregate of a plurality n of cells individually including subdomains which are formed by dividing a region where the electronic part is to be disposed.

According to such configuration, thermal couplings among the cells become loose.

Therefore, temperatures of respective parts of the electronic part are individually varied due to the heat flowing in and out between the outside and the inner chamber, and the changes in characteristics are localized due to the variations in temperatures.

The above-described objects are also achieved by configuring the coupling means as an aggregate of a plurality K of coupling means which are individually connected to a plurality K of terminals of the electronic part and disposed in the inner chamber; and forming the inner chamber as an aggregate of a plurality K of cells in which pairs of the plurality K of terminals and the plurality K of coupling means are respectively disposed, and which are divided by a conductor grounded outside.

According to such configuration, the coupling among the cells is suppressed, and pairs of the coupling means and the terminals of the electronic part individually connected to these coupling means are respectively disposed in these cells.

Therefore, undesirable electric coupling in the inner chamber is suppressed or prevented.

The above-described objects can also be achieved by forming the inner chamber in the shape and size capable of containing a casing of the electronic part.

According to such configuration, the electronic part is accommodated in the inner chamber without having the casing removed.

Therefore, the operating temperature of the electronic part is maintained in a stable condition in the heat protection configuration that is formed in duplex structure by the interior of the casing and the inner chamber.

The above-described objects can also be achieved by the coupling means having a filtering characteristic that has a pass band in an occupied band of signals to be transmitted between the electronic part and the outside through the coupling means.

According to such configuration, the band of the signals transmitted between the terminals of the electronic part and the equipments or circuits disposed outside of the cabinet are limited to the occupied band of the signals.

Therefore, noise given through the equipments or circuits or noise generated by the electronic part is suppressed.

The above-described object can also be achieved by setting a thermal conductivity between the outside of the cabinet and the inner chamber to a value that the temperature at which the electronic part operates is maintained under the distribution of temperatures outside of the cabinet.

According to such configuration, the electronic part operates in a stable condition without having means for raising or lowering the temperatures of the inner chamber as long as the outside temperature of the cabinet shifts within the range of temperature distribution applied when the thermal conductivity is determined.

Besides, the above-described objects can be achieved by a thermostatic chamber which comprises the heat insulation chamber configured as described above; and a heat exchanging means that performs heat exchange with an inner chamber formed in a cabinet under control of a thermoregulator which maintains an operating temperature of the electronic part accommodated into the cabinet configuring the heat insulation chamber.

According to such configuration, when activated, the temperature of the inner chamber is set more quickly to a temperature at which the electronic part operates under the heat exchange as compared with the heat insulation chamber in which the heat exchange is not performed at all, and the temperature thus set is securely maintained even under the environment that the outside temperature of the cabinet largely varies.

The above-described objects can also be achieved by a cryostat that is configured by the heat exchanging means that maintains the temperature of the inner chamber at a cryogenic temperature that the electronic part is to operate under control of the thermoregulator.

By this cryostat, energy required for the heat exchange performed by the heat exchanging means is decreased because quantity of heat flowing from the outside of the cabinet into the inner chamber decreases more than in the prior art.

Other objects and features of the present invention will be apparent from the following detailed description with reference to the accompanying drawings.

BRIEF DESCRIPTION OF THE DRAWINGS

FIG. 14 is a diagram showing the fifth embodiment according to the present invention;

FIG. 15 is a diagram showing the sixth embodiment according to the present invention; and FIG. 16 is a diagram showing an example of a configuration of a conventional cryostat.

DETAILED DESCRIPTION OF THE PREFERRED EMBODIMENT

The principle of a heat insulation chamber according to the present invention will be described with reference to FIG. 1.

Figure 1:
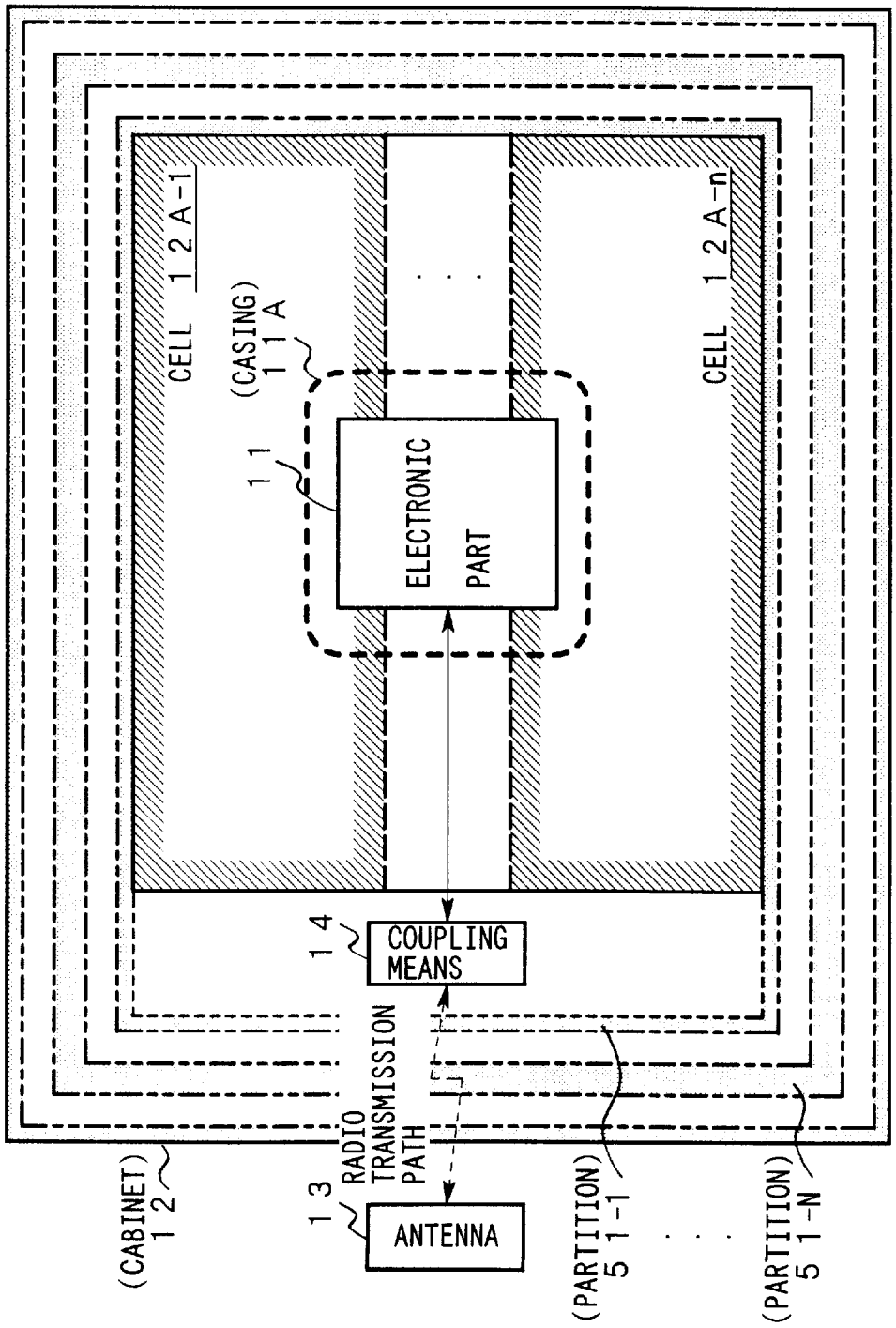
FIG. 1 is a diagram showing the principle of the first heat insulation chamber according to the present invention.

FIG. 1 is a diagram showing the principle of the first insulation chamber according to the present invention.

The heat insulation chamber shown in FIG. 1 comprises a cabinet 12 forming an inner chamber for accommodating an electronic part 11, an antenna 13 and a coupling means 14 which are respectively disposed outside and inside of the cabinet 12, partitions 51-1 to 51-N formed by the cabinet12, and cells 12A-1 to 12A-n which are formed by dividing the inner chamber.

The first principle of the heat insulation chamber according to the present invention is as follows.

The cabinet 12 forms the inner chamber for accommodating the electronic part 11 and is made of heat insulating material.

The coupling means 14 is disposed in the inner chamber or the cabinet 12, is connected to the electronic part 11, and forms a radio transmission path to the antenna 13 which is disposed outside of the cabinet 12.

The heat insulation chamber configured as described above has the following functions.

The electronic part 11 is accommodated in the inner chamber formed by the cabinet 12 that is made of heat insulating material.

The electronic part 11 transmits and/or receives desired radio signals through the radio transmission path formed by the coupling means 14 with the antenna 13 which is disposed outside of the cabinet 12 with equipments or circuits, to which a feeding point of the antenna 13 is connected.

Thermal conductivity of such radio transmission paths are generally considerably small as compared with that of a conductor, so heat which flows from the outside into the inner chamber or flows out of the inner chamber is suppressed as compared with the above-described prior art in which the radio signals are transmitted through wire.

Therefore, the electronic part 11 can output the radio signals with an operating temperature kept in a stable condition or can desirably process the radio signals.

The inner chamber formed by the cabinet 12 does not have the antenna 13 disposed, so it can be downsized and maintain high flexibility in arranging its inner layout.

Now, the second principle of the heat insulation chamber according to the present invention will be described with reference to FIG. 2.

Figure 2:
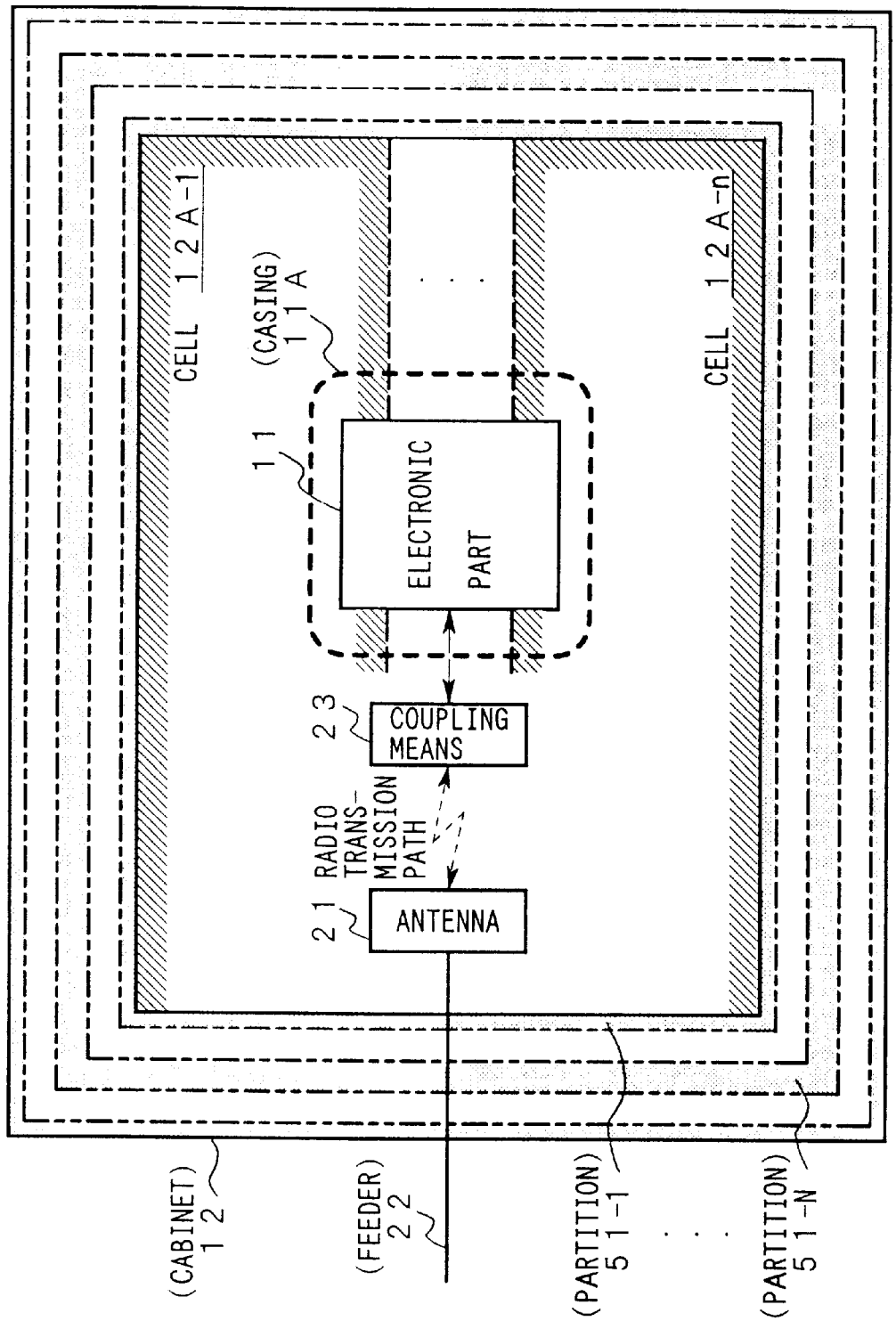
FIG. 2 is a diagram showing the principle of the second heat insulation chamber according to the present invention.

FIG. 2 is a diagram showing the second principle of the heat insulation chamber according to the present invention.

The heat insulation chamber shown in FIG. 2 comprises a cabinet 12 forming an inner chamber in which an electronic part 11 is accommodated, an antenna 21 and a coupling means 23 which are disposed to face each other in the cabinet 12, a feeder 22 for leading the feeding point of the antenna 21 to the outside, partitions 51-1 to 51-N formed by the cabinet 12, and cells 12A-1 to 12A-n which are formed by dividing the inner chamber.

The second principle of the heat insulation chamber according to the present invention is as follows.

The cabinet 12 forms the inner chamber for accommodating the electronic part 11 and is made of heat insulating material. The antenna 21 is disposed in the inner chamber or the cabinet 12. The feeder 22 leads the feeding point of the antenna 21 to the outside of the cabinet 12. The coupling means 23 is disposed in the inner chamber or the cabinet 12, has the feeding point connected to the electronic part 11 and forms a radio transmission path to the antenna 21.

The heat insulation chamber configured as described above has the following functions.

The electronic part 11 is accommodated in the inner chamber formed by the cabinet 12 that is made of heat insulating material. The coupling means 23 is disposed in the inner chamber or the cabinet 12 and forms a radio transmission path to the antenna 21 which has the feeding point leading to the outside of the cabinet 12 through the feeder 22. The electronic part 11 transmits and/or receives desired radio signals through the radio transmission path with the equipments or circuits which are connected to the feeder 22 at the outside of the cabinet 12.

Thermal conductivity of the radio transmission path is generally considerably small as compared with that of a conductor, so that heat which flows in and out between the outside and the inner chamber is suppressed as compared with the above-described prior art in which the radio signals are transmitted through wires.

Therefore, the electronic part 11 can output the radio signals with an operating temperature kept in a stable condition or can desirably process the radio signals.

The inner chamber formed by the cabinet 12 has the antenna 21 and the coupling means 23 disposed, so the transfer characteristics of the radio transmission path suddenly or extensively changing hardly happens even when the outside environment of the cabinet 12 has changed.

Therefore, the operating environment of the electronic part 11 is maintained in a stable condition.

The third principle of the heat insulation chamber according to the present invention will be described with reference to FIG. 3.

Figure 3:
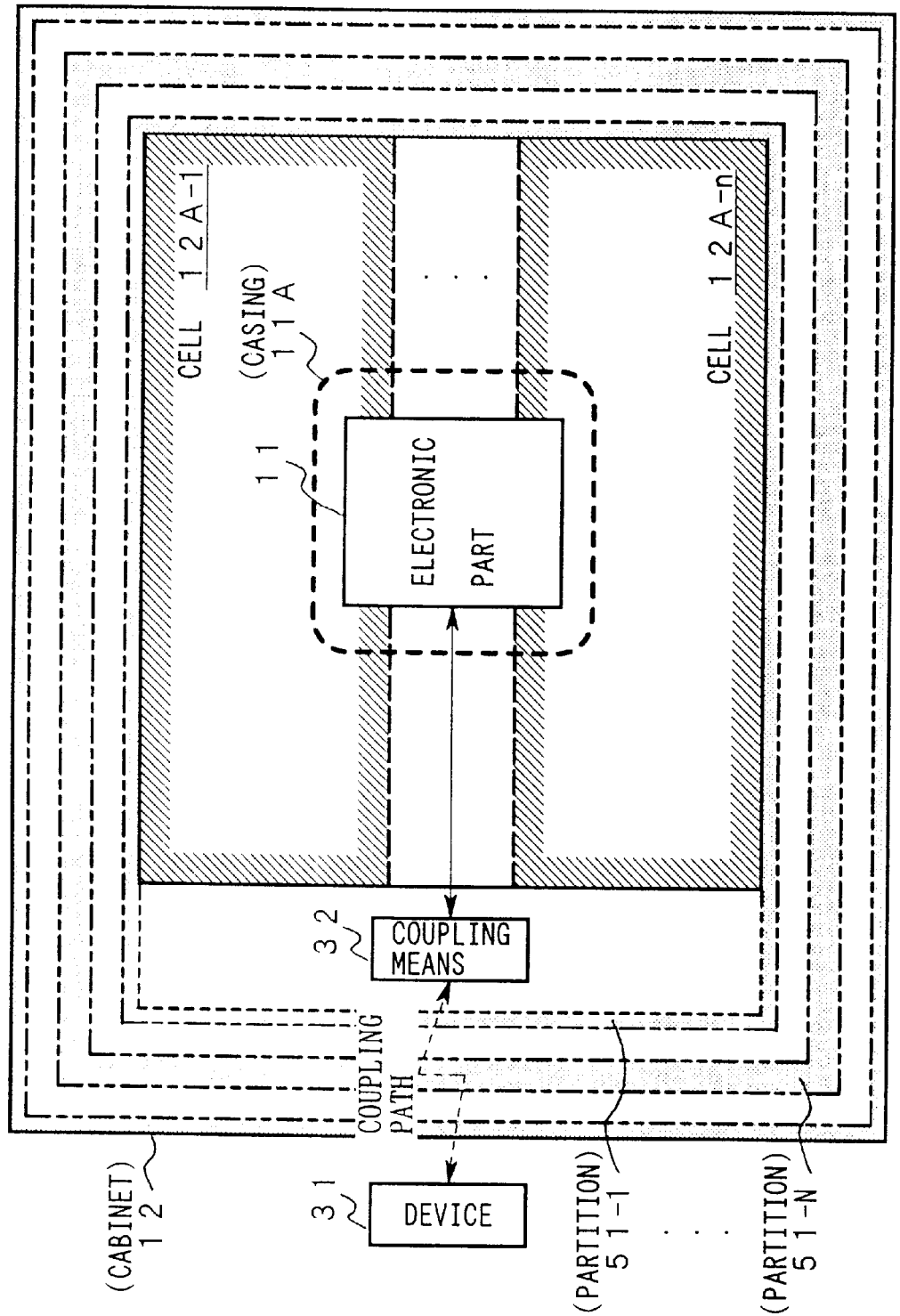
FIG. 3 is a diagram showing the principle of the third heat insulation chamber according to the present invention.

FIG. 3 is a diagram showing the third principle of the heat insulation chamber according to the present invention.

The heat insulation chamber shown in FIG. 3 comprises a cabinet 12 forming an inner chamber in which an electronic part 11 is accommodated, a device 31 and a coupling means 32 which are respectively disposed outside and inside of the cabinet 12, partitions 51-1 to 51-N formed by the cabinet 12, and cells 12A-1 to 12A-n which are formed by dividing the inner chamber.

The third principle of the heat insulation chamber according to the present invention is as follows.

The cabinet 12 forms the inner chamber in which the electronic part 11 is accommodated, and is made of heat insulating material. The coupling means 32 is disposed in the inner chamber or the cabinet 12, is connected to the electronic part 11 and forms a coupling path by static coupling and/or inductive coupling to the device 31 disposed outside of the cabinet 12.

The heat insulation chamber configured as described above has the following functions.

The electronic part 11 is accommodated in the inner chamber formed by the cabinet 12 which is made of heat insulating material. Moreover, the electronic part 11 transmits and/or receives desired signals with the equipments or circuits connected to the device 31, through a coupling path which is formed between the coupling means 32 and the device 31 disposed outside of the cabinet 12 by static coupling and/or inductive coupling.

Thermal conductivity of the coupling path is generally considerably small as compared with that of a conductor, so that quantity of heat which flows in and out between the outside and the inner chamber is suppressed as compared with the prior art in which the signals are transmitted through wires.

Therefore, the electronic part 11 can output the signals with the operating temperature kept in a stable condition or can desirably process the signals.

The inner chamber formed by the cabinet 12 does not have the device 31 disposed, so it can be downsized, and allowing the maintenance of high flexibility in arranging its inner layout.

The fourth principle of the heat insulation chamber according to the present invention will be described with reference to FIG. 4.

Figure 4:
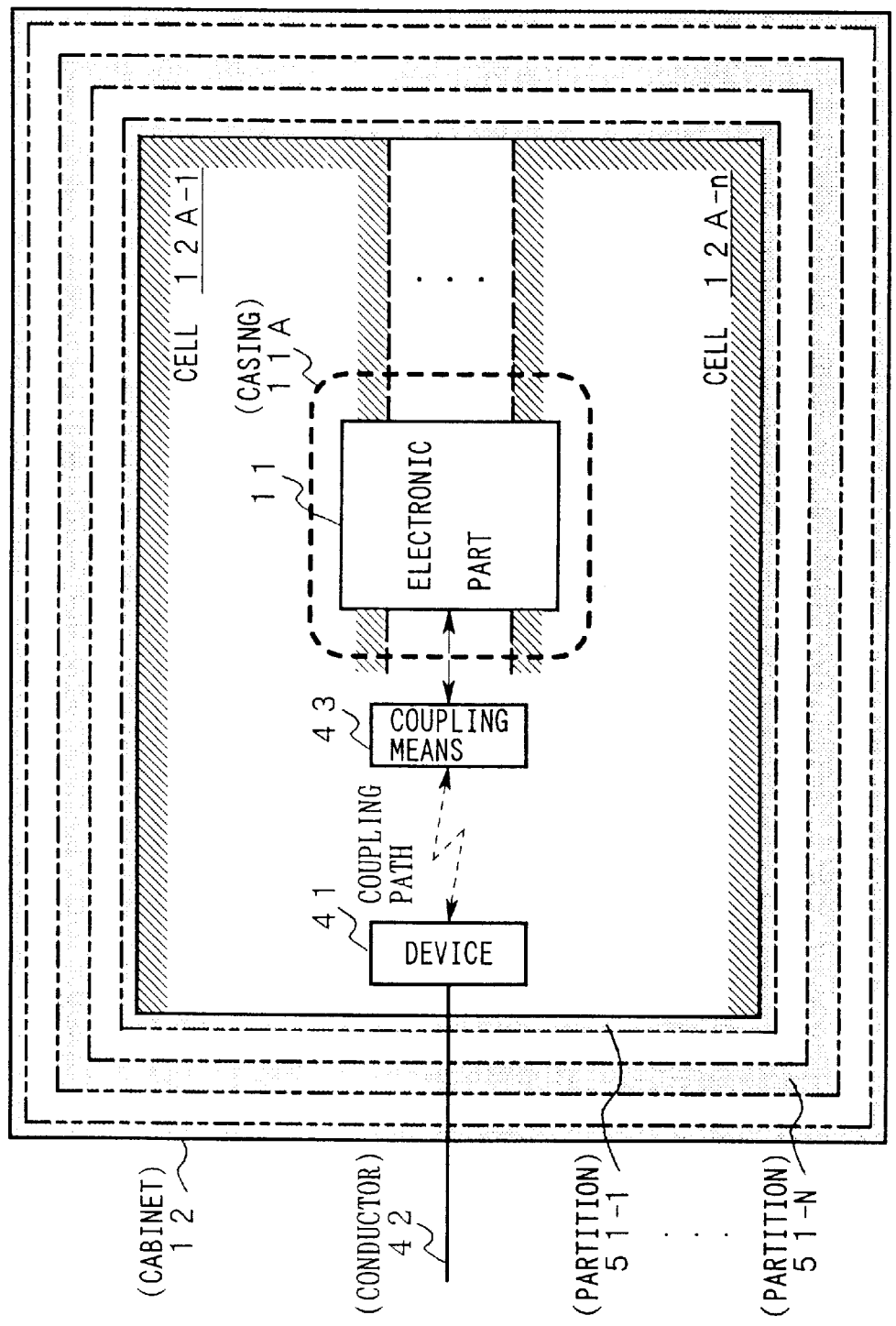
FIG. 4 is a diagram showing the principle of the fourth heat insulation chamber according to the present invention.

FIG. 4 is a diagram showing the fourth principle of the heat insulation chamber according to the present invention.

The heat insulation chamber shown in FIG. 4 comprises a cabinet 12 forming an inner chamber in which an electronic part 11 is accommodated, a device 41 and a coupling means 43 which are disposed to face each other in the cabinet 12, a conductor 42 whose one end is connected to the device and the other end of which is led to the outside of the cabinet 12, partitions 51-1 to 51-N formed by the cabinet 12, and cells 12A-1 to 12A-n which are formed by dividing the inner chamber.

The fourth principle of the heat insulation chamber according to the present invention is as follows.

The cabinet 12 forms the inner chamber for accommodating the electronic part 11 and is made of heat insulating material.

The device 41 is disposed in the inner chamber or the cabinet 12. The conductor 42 leads a terminal of the device 41 to the outside of the cabinet 12. The coupling means 43 is disposed in the inner chamber or the cabinet 12, is connected to the electronic part 11 and forms a coupling path with the device 41 by static coupling and/or inductive coupling.

The heat insulation chamber configured as described above has the following functions.

Moreover, the electronic part 11 is accommodated in the inner chamber formed by the cabinet 12 which is made of heat insulating material. The coupling means 43 is disposed in the inner chamber or the cabinet 12, and forms a coupling path to the device 41, which is led to the outside of the cabinet 12 through the conductor 42, by static coupling and/or inductive coupling.

The electronic part 11 transmits and/or receives desired radio signals with the equipments or circuits which are connected to the conductor 41 at the outside of the cabinet 12 through the coupling path.

Thermal conductivity of the coupling path is generally considerably small as compared with that of a conductor, so heat which flows in and out between the outside and the inner chamber is suppressed as compared with the prior art in which the signals are transmitted through wires.

Therefore, the electronic part 11 can output the signals with an operating temperature kept in a stable condition or can desirably process the signals.

The inner chamber formed by the cabinet 12 has the device 41 and the coupling means 43 disposed inside, so the transfer characteristics of the coupling path suddenly or extensively changing hardly happens even if the outside environment of the cabinet 12 has changed.

Therefore, the operating environment of the electronic part 11 is maintained in a stable condition.

The fifth principle of the heat insulation chamber according to the present invention will be described with reference to FIG. 1 to FIG. 4.

The cabinet 12 forms the partitions 51-1 to 51-N between the outside and the inner chamber in which the electronic part 11 is accommodated. The coupling means 14, 23, 32, and 43 are disposed together with the electronic part 11 in the inner chamber.

The heat insulation chamber configured as described above has the partitions 51-1 to 51-N between the outside of the cabinet 12 and the inner chamber in which the electronic part 11 is accommodated, so a single or multiple inner chamber(s) is/are formed in a layer between the inner chamber and the outside of the cabinet 12 by the partitions 51-1 to 51-N.

Therefore, the operating temperature of the electronic part 11 is maintained in a stable condition with the weight kept from increasing.

The coupling means 14, 23, 32, and 43 are disposed together with the electronic part 11 in the inner chamber, so the mechanical configuration can be simplified and coupling with the electronic part 11 can be made close as compared with the case that the coupling means 14, 23, 32, and 43 are disposed in any of the inner chambers formed by the partitions 51-1 to 51-N as described above.

The sixth principle of the heat insulation chamber according to the present invention will be described with reference to FIG. 1 to FIG. 3.

The cabinet 12 forms the partitions 51-1 to 51-N between the outside and the inner chamber in which the electronic part 11 is accommodated. The coupling means 14, 23, 32, and 43 are disposed in the region sandwiched between the outer wall of the cabinet 12 and the interior wall of the inner chamber.

The heat insulation chamber configured as described above has the partitions 51-1 to 51-N between the outside of the cabinet 12 and the inner chamber in which the electronic part 11 is accommodated, so that a single or multiple inner chamber(s) is/are formed in a layer between the inner chamber and the outside of the cabinet 12 by the partitions 51-1 to 51-N.

Therefore, the operating temperature of the electronic part 11 is maintained in a stable condition with the weight kept from increasing.

The coupling means 14, 23, 32, and 43 are disposed within the side walls of the cabinet 12 but in a region other than the above-described inner chambers, so that transmission characteristics and transfer characteristics does not change remarkably or suddenly because of the medium or environment in the inner chambers where the electronic part 11 is disposed and a radio transmission path or coupling path is formed in a stable condition between the electronic part 11 and the outside of the cabinet 12.

The seventh principle of the heat insulation chamber according to the present invention will be described with reference to FIG. 1 to FIG. 4.

The inner chamber is formed as an aggregate of a plurality n of cells 12A-1 to 12A-n individually including subdomains formed by dividing the region where the electronic part 11 is disposed.

The heat insulation chamber configured as described above has the inner chamber, where the electronic part 11 is accommodated, formed as an aggregate of a plurality n of cells 12A-1 to 12A-n individually including subdomains formed by dividing the region where the electronic part 11 is disposed.

Thermal coupling among the cells 12A-1 to 12A-n is loose, so temperatures of respective parts of the electronic part 11 independently vary due to the heat flowing from the outside into the inner chamber or flowing out of the inner chamber, and the changes in characteristics are localized due to the variations in temperatures.

The eighth principle of the heat insulation chamber according to the present invention will be described with reference to FIG. 5.

Figure 5:
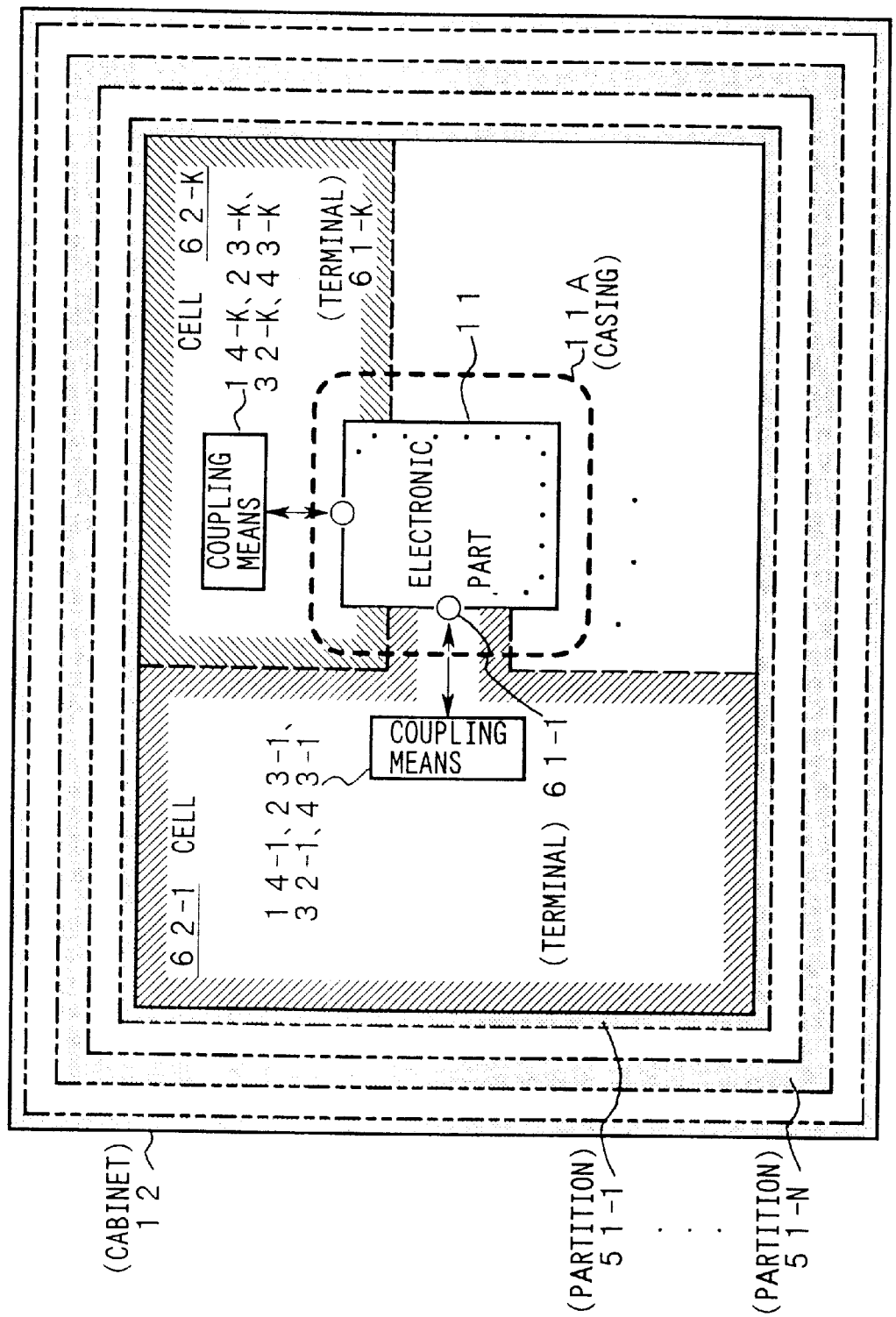
FIG. 5 is a diagram showing the principle of the fifth heat insulation chamber according to the present invention.

FIG. 5 is a diagram showing the fifth principle of the heat insulation chamber according to the present invention.

The heat insulation chamber shown in FIG. 5 comprises a cabinet 12 forming cells 62-1 to 62-K in which an electronic part 11 is accommodated, coupling means 14-1 to 14-K, 23-1 to 23-K, 32-1 to 32-K, and 43-1 to 43-K individually disposed in the cells 62-1 to 62-K, and partitions 51-1 to 51-N formed by the cabinet 12.

The eighth principle of the heat insulation chamber according to the present invention is as follows.

The coupling means 14, 23, 32, and 43 are individually connected to a plurality K of terminals 61-1 to 61-K of electronic part 11 and are configured as an aggregate of a plurality K of coupling means 14-1, 23-1, 32-1, 43-1, . . . , 14-K, 23-K, 32-K, and 43-K disposed within the inner chamber. The inner chamber is formed as an aggregate of a plurality K of cells 62-1 to 62-K in which pairs of the plurality K of terminals 61-1 to 61-K and the plurality K of coupling means 14-1, 23-1, 32-1, 43-1, . . . , 14-K, 23-K, 32-K, and 43-K are individually disposed and are divided by a conductor which is grounded outside of the inner chamber.

The heat insulation chamber configured as described above has the following functions.

The inner chamber in which the electronic part 11 is accommodated is formed as an aggregate of the plurality K of cells 62-1 to 62-K in which the pairs of the plurality K of terminals 61-1 to 61-K of the electronic part 11 and the coupling means 14-1, 23-1, 32-1, 43-1, . . . , 14-K, 23-K, 32-K, and 43-K respectively connected to the terminals 61-1 to 61-K are individually disposed and are divided by the conductor grounded outside of the inner chamber.

In other words, the cells 62-1 to 62-K are electrically shielded from one another, and the pairs of the coupling means 14-1, 23-1, 32-1, 43-1, . . . , 14-K, 23-K, 32-K, and 43-K and the terminals 61-1 to 61-K of the electronic part 11 individually connected to the coupling means 14-1, 23-1, 32-1, 43-1, . . . , 14-K, 23-K, 32-K, and 43-K are individually disposed in the cells 61-1 to 62-K, so undesirable electric coupling is suppressed or prevented in the inner chamber.

The ninth principle of the heat insulation chamber according to the present invention will be described with reference to FIG. 5.

The inner chamber is formed in the shape and size capable of containing a casing 11A in which the main body of the electronic part 11 is accommodated.

In the heat insulation chamber configured as described above, the electronic part 11 is accommodated in the unique casing 11A, and the inner chamber in which the electronic part 11 is accommodated is formed in the shape and size capable of containing the casing 11A.

In other words, the electronic part 11 is accommodated into the inner chamber without removing the casing 11A, so the operating temperature of the electronic part 11 is maintained in a stable condition in a heat protection configuration which is formed in duplex structure by the interior of the casing 11A and the inner chamber.

The tenth principle of the heat insulation chamber according to the present invention will be described with reference to FIG. 5.

The coupling means 14, 23, 32, and 43 have filtering characteristics with a pass band in an occupied band of signals to be transmitted between the electronic part 11 and the outside through the coupling means 14, 23, 32, and 43.

In the heat insulation chamber configured as described above, the band of signals to be transmitted between terminals of the electronic part 11 and the equipments or circuits disposed outside of the cabinet 12 is limited to the occupied band of the signals so noise which is given through the equipments or circuits or generated by the electronic part 11 can be suppressed.

The eleventh principle of the heat insulation chamber according to the present invention will be described with reference to FIG. 5.

Thermal conductivity between the outside of the cabinet 12 and the inner chamber is set to a value that the temperature at which the electronic part 11 operates is maintained under the distribution of temperatures outside of the cabinet 12.

In the heat insulation chamber configured as described above, the electronic part 11 operates in a stable condition without having means for raising or lowering the temperatures of the inner chamber as long as the outside temperature of the cabinet 12 shifts within the range of the temperature distribution applied when the thermal conductivity is determined.

The principle of a thermostatic chamber according to the present invention will be described with reference to FIG. 6.

Figure 6:
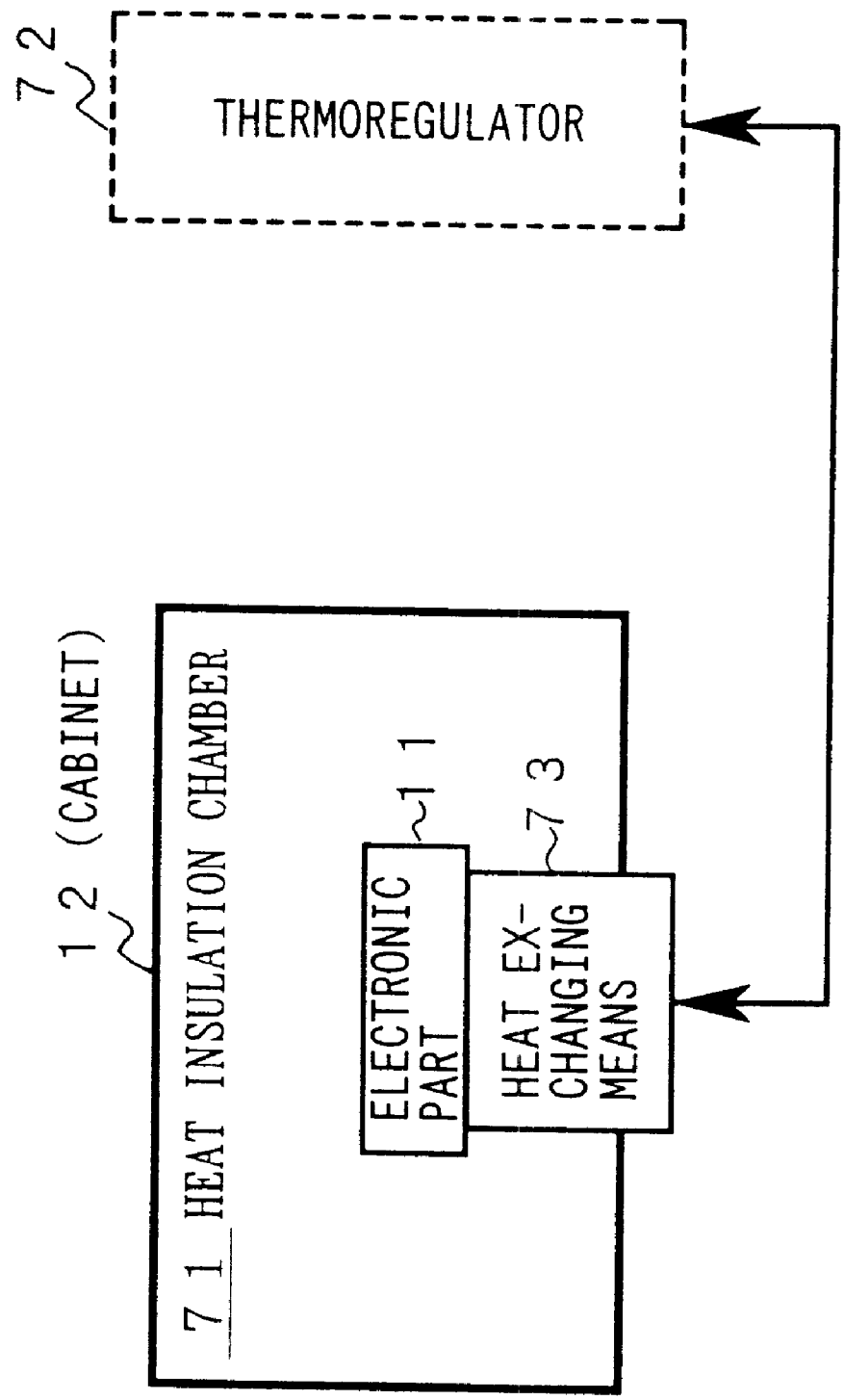
FIG. 6 is a diagram showing the principle of a thermostatic chamber and a cryostat according to the present invention.

FIG. 6 is a diagram showing the principle of a thermostatic chamber and a cryostat according to the present invention.

The thermostatic chamber shown in FIG. 6 comprises a heat insulation chamber 71 according to the present invention described above, a thermoregulator 72, and a heat exchanging means 73.

The principle of the thermostatic chamber according to the present invention is as follows.

The heat insulation chamber 71 is configured with the present invention described above applied. The heat exchanging means 73 exchanges heat with the inner chamber formed in the cabinet 12 under control of the thermoregulator 72 which maintains the operating temperature of the electronic part 11 accommodated in the cabinet 12 which configures the heat insulation chamber 71.

The thermostatic chamber configured as described above has the following functions.

The heat exchanging means 73 exchanges heat with the inner chamber formed in the cabinet 12 under control of the thermoregulator 72 for maintaining the operating temperature of the electronic part 11 accommodated in the cabinet 12 which configures the heat insulation chamber 71. A thermal conductivity of a coupling path and a radio transmission path of signals transmitted between the electronic part 11 and the equipments or circuits disposed outside of the cabinet 12 is considerably small as compared with that in the prior art which has a transmission path formed of a conductor.

Therefore, when activated, the temperature of the inner chamber is set more quickly to a level at which the electronic part 11 operates under the heat exchange as compared with the heat insulation chamber in which the heat exchange is not performed at all, and the temperature thus set is kept securely even under the environment that the outside temperature of the cabinet 12 largely varies.

The principle of the cryostat according to the present invention will be described with reference to FIG. 6.

The heat exchanging means 73 maintains the inner chamber at a cryogenic temperature that the electronic part 11 operates under control of the thermoregulator 72.

The cryostat configured as described above has the following functions.

A thermal conductivity of a coupling path and a radio transmission path of signals transmitted between the electronic part 11 and the equipments or circuits disposed outside of the cabinet 12 is considerably small as compared with that in the prior art having a coupling path formed of a conductor.

In other words, quantity of heat flowing in and out between the outside of the cabinet 12 and the inner chamber decreases as compared with the prior art, so energy required for the heat exchange performed by the heat exchanging means 73 decreases.

An embodiment of the heat insulation chamber, the thermostatic chamber, and the cryostat according to the present invention will be described with reference to FIG. 7 to FIG. 15.

Figure 7:
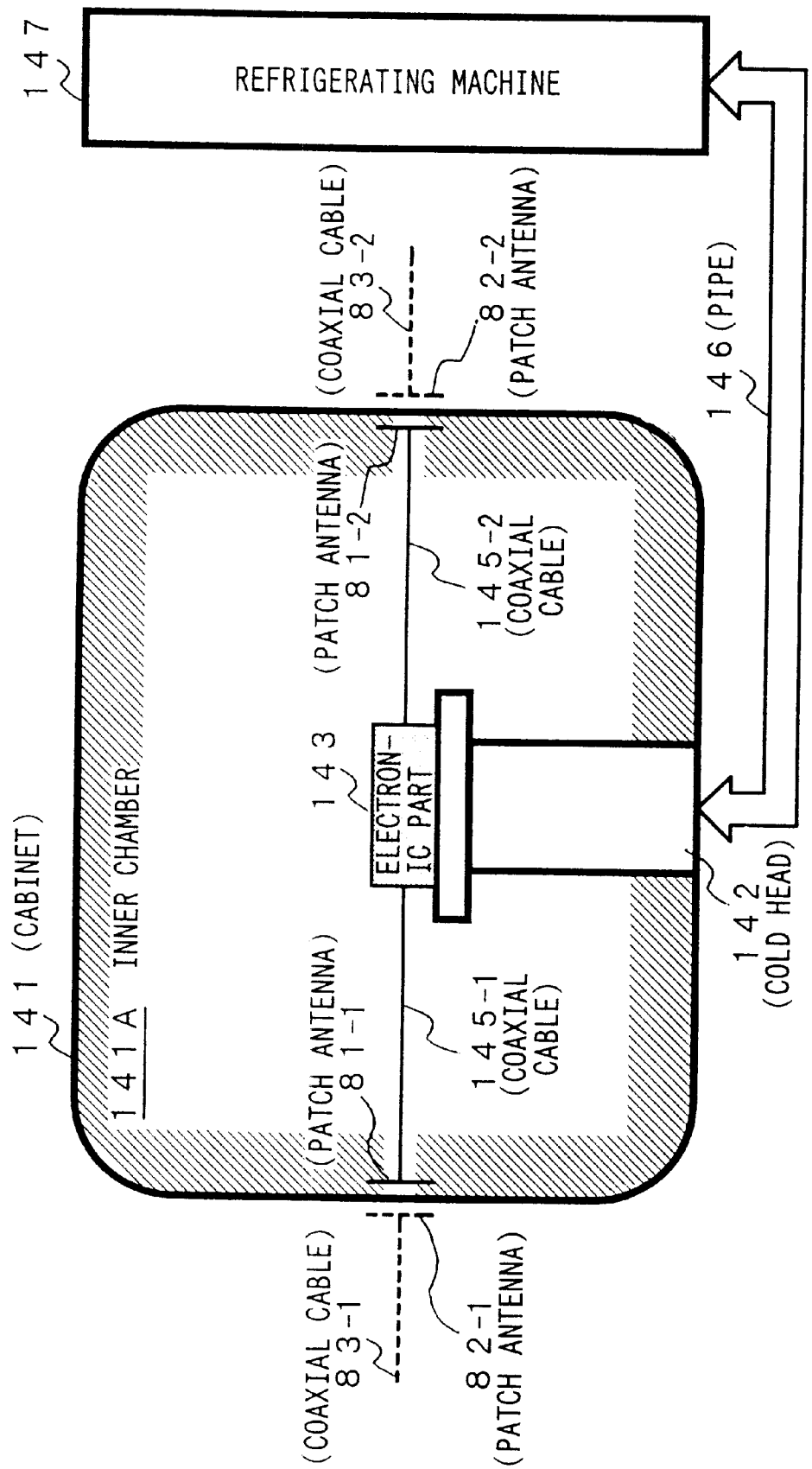
FIG. 7 is a diagram showing the first and seventh embodiments according to the present invention.

FIG. 7 is a diagram showing the first and seventh embodiments of the present invention.

In the drawing, parts having the same functions and configurations as those shown in FIG. 16 are designated by the same reference numerals and their descriptions are omitted.

Figure 8:
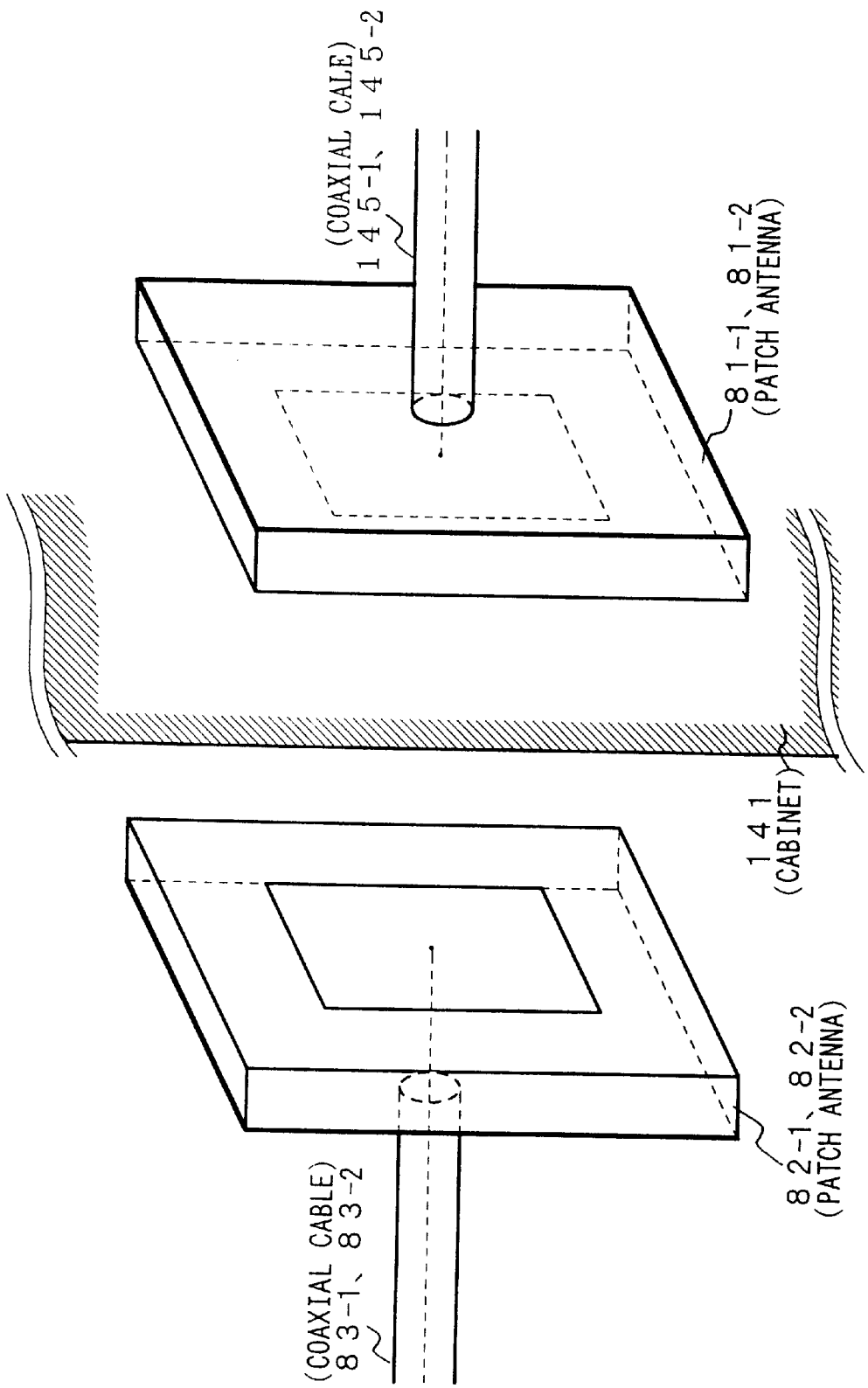
FIG. 8 is a diagram showing the configuration of a coupling part of the embodiment.
Figure 9:
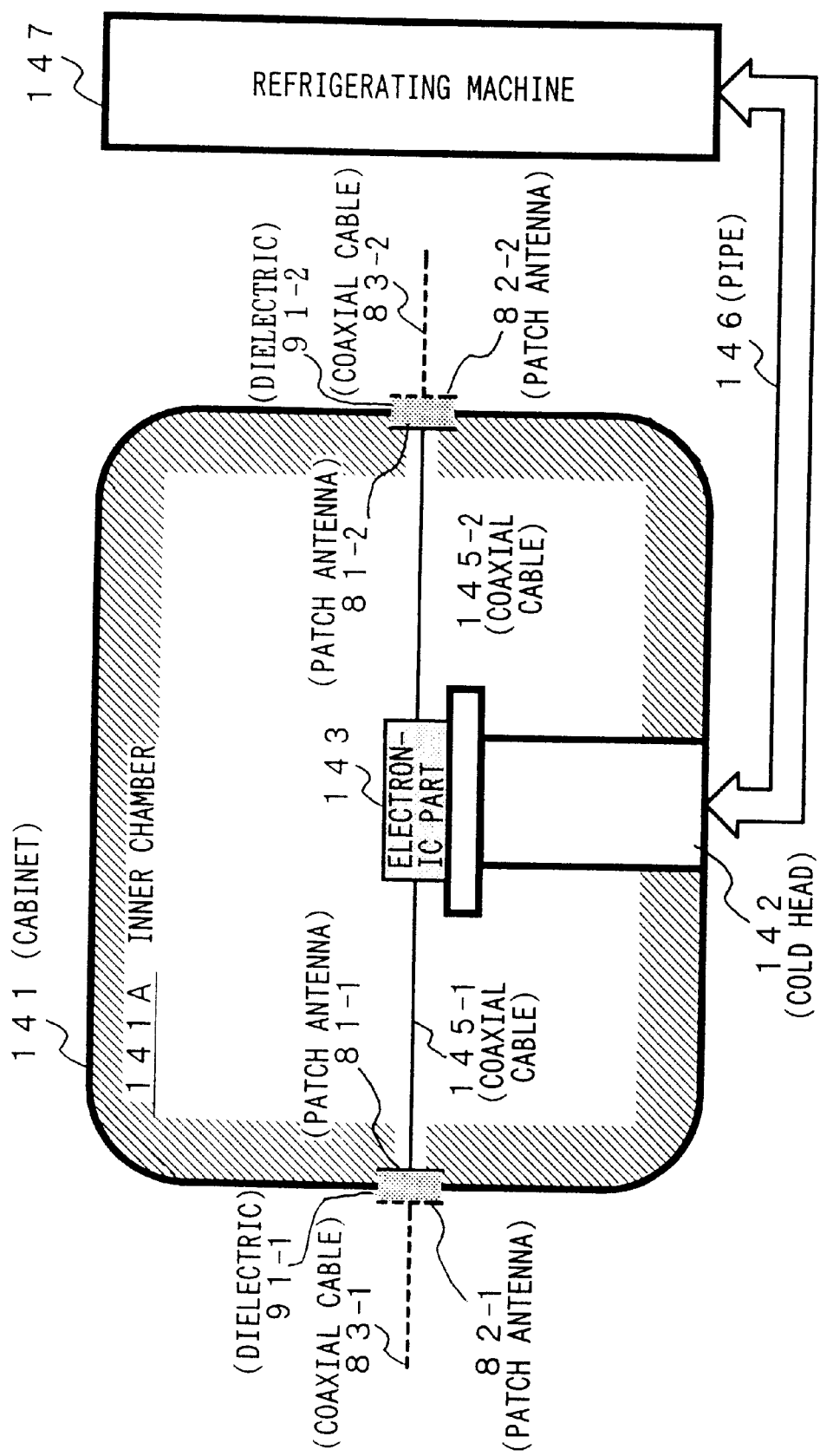
FIG. 9 is a diagram showing another configuration of the first embodiment according to the present invention.

Differences of the configurations between this embodiment and the prior art shown in FIG. 16 are that the through holes 144-1 and 144-2 are not formed on the side walls of a cabinet 141, patch antennas 81-1 and 81-2 are formed on two interior walls of the cabinet 141 facing each other closest to the input and output terminals of the electronic part 143 as shown in FIG. 8, ends of coaxial cables 145-1 and 145-2 are respectively connected to feeding points of the patch antennas 81-1 and 81-2, patch antennas 82-1 and 82-2 are disposed on two outer walls of the cabinet 141, which are opposite to the patch antennas 81-1 and 81-2, and ends of coaxial cables 83-1 and 83-2 are respectively connected to feeding points of the patch antennas 82-1 and 82-2.

As to the correspondences of this embodiment to the components shown in FIG. 1, FIG. 2 and FIG. 6, the electronic part 143 corresponds to the electronic part 11, the cabinet 141 corresponds to the cabinet 12, the antennas 82-1 and 82-2 correspond to the antennas 13 and 21, the patch antennas 81-1 and 81-2 and the coaxial cables 83-1 and 83-2 correspond to the coupling means 14 and 23, the cabinet 141, the coaxial cables 145-1, 145-2, 83-1, and 83-2, and the patch antennas 81-1, 81-2, 82-1, and 82-2 correspond to the heat insulation chamber 71, a refrigerating machine 147 and a pipe 146 correspond to the thermoregulator 72, and a cold head 142 corresponds to the heat exchanging means 73.

Operations of this embodiment will be described with reference to FIG. 7 and FIG. 8.

An input terminal of the electronic part 143, which is mounted on the top of the cold head 142 and has its operating temperature kept at a desired cryogenic temperature by the refrigerating machine 147 through the cold head 142 and the pipe 146, receives desired radio signals from circuits disposed outside through the coaxial cable 83-1, the radio transmission path formed between the patch antennas 82-1 and 81-1, and the coaxial cable 145-1.

Radio signals output by the electronic part 143 according to such radio signals are given to predetermined outside circuits through the coaxial cable 145-2, the radio transmission path formed between the patch antennas 81-2 and 82-2, and the coaxial cable 83-2.

These radio transmission paths are formed without the presence of a "medium having a high thermal conductivity" such as the inner or outer conductor of the coaxial cables 145-1 and 145-2. Therefore, heat quantity to be heat exchanged through the cold head 142 under control of the refrigerating machine 147 is decreased and the desired performance is maintained in a stable condition as long as the medium present respectively between the patch antenna 82-1 and the patch antenna 81-1 and the medium present between the patch antenna 81-2 and the patch antenna 82-2 have small thermal conductivity and the losses are tolerably small as a radio transmission path.

In this embodiment, on the side walls of the cabinet 141, the region where the patch antennas 82-1 and 81-1 are facing each other and the region where the patch antennas 81-2 and 82-2 are facing each other are filled with a member that are non-conductive and the propagation loss of the above-described radio signals becomes a tolerably small value. However, where the propagation loss is to be decreased, dielectrics 91-1 and 91-2 may be mounted in the space where the patch antennas 82-1 and 81-1 are facing each other and the space where the patch antennas 81-2 and 82-2 are facing each other as shown in a hatched area of FIG. 9 for example.

In this embodiment, the patch antennas 82-1 and 82-2 are mounted to face the patch antennas 81-1 and 81-2 through the side walls of the cabinet 141. But, for example, by the through holes 144-1 and 144-2 being formed on the side walls of the cabinet 141, the patch antennas 82-1 and 82-2 being disposed together with the patch antennas 81-1 and 81-2 within the inner chamber 141A, and one end of the coaxial cables 83-1 and 83-2 being extended to the outside of the cabinet 141 through the through holes 144-1 and 144-2, the coaxial cables 145-1 and 145-2 from the feeding points of the patch antennas 81-1 and 81-2 to the input and output terminals of the electronic part 143 are shortened, overall characteristics of the electronic part 143 are improved, or the flexibility of arrangement within the inner chamber 141A may be improved.

Besides, in this embodiment, the patch antennas 82-1 and 82-2 are disposed on the outer walls of the cabinet 141 but by being incorporated as part of the circuit to be disposed outside of the cabinet 141, the electronic part 143 containing the cabinet 141 can be fit and removed freely, or flexibility of arranging components may be secured within a tolerable range of the loss of the radio transmission.

Figure 10:
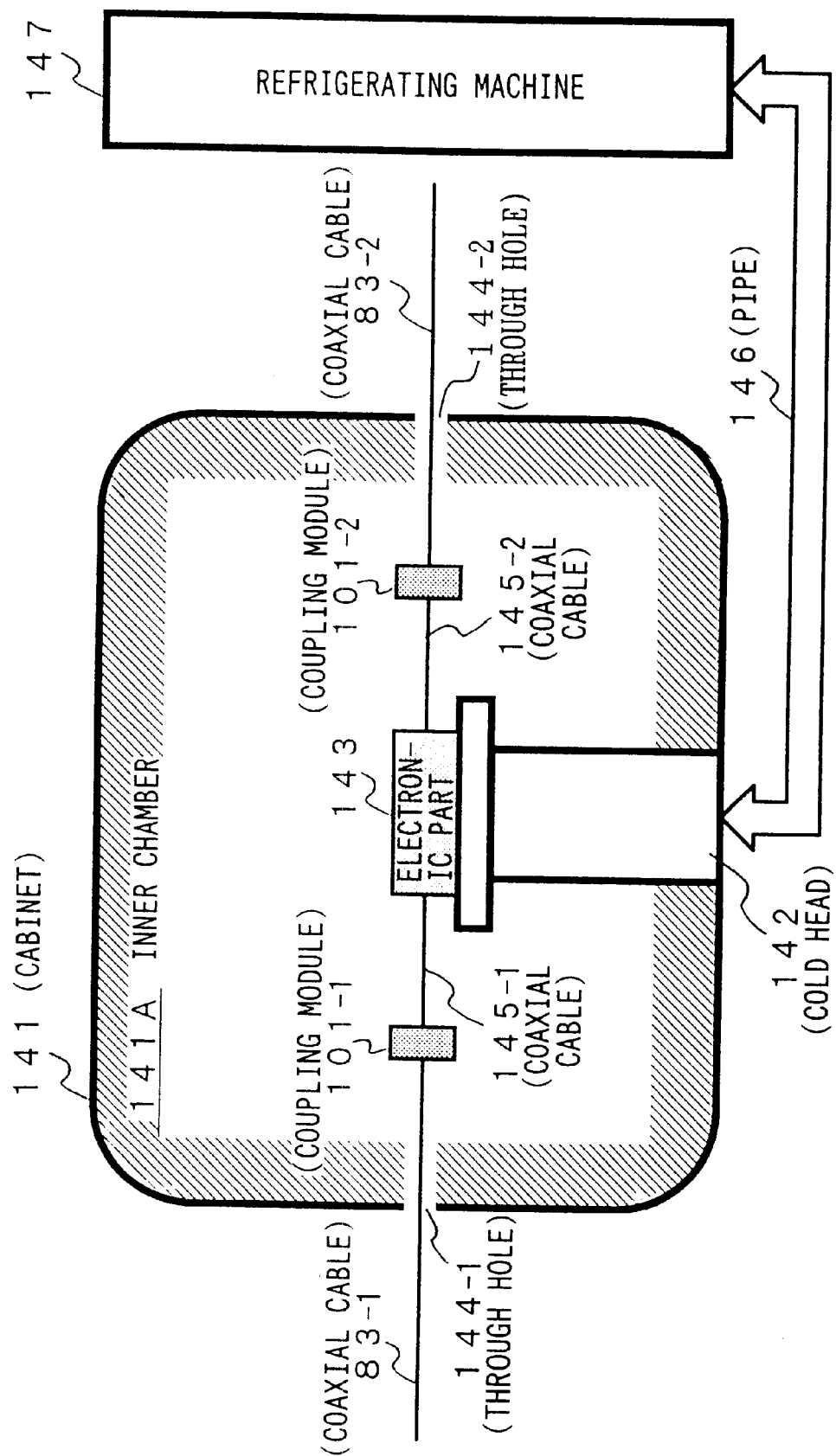
FIG. 10 is a diagram showing the second embodiment according to the present invention.

FIG. 10 is a diagram showing the second embodiment of the present invention.

In the drawing, parts having the same functions and configurations as those shown in FIG. 7 are designated by the same reference numerals and their descriptions are omitted.

Differences of the configurations between this embodiment and the embodiment shown in FIG. 7 are that the above-described through holes 144-1 and 144-2 are formed, coupling modules 101-1 and 101-2 are disposed instead of the patch antennas 81-1 and 81-2 in the vicinity of the regions where the through holes 144-1 and 144-2 are formed on the interior walls of the cabinet 141, the coaxial cables 83-1and 83-2 are extended to the outside of the cabinet 141 through the through holes 144-1 and 144-2, and the through holes 144-1 and 144-2 are sealed with the coaxial cables 83-1 and 83-2 passed through them.

Figure 11A:
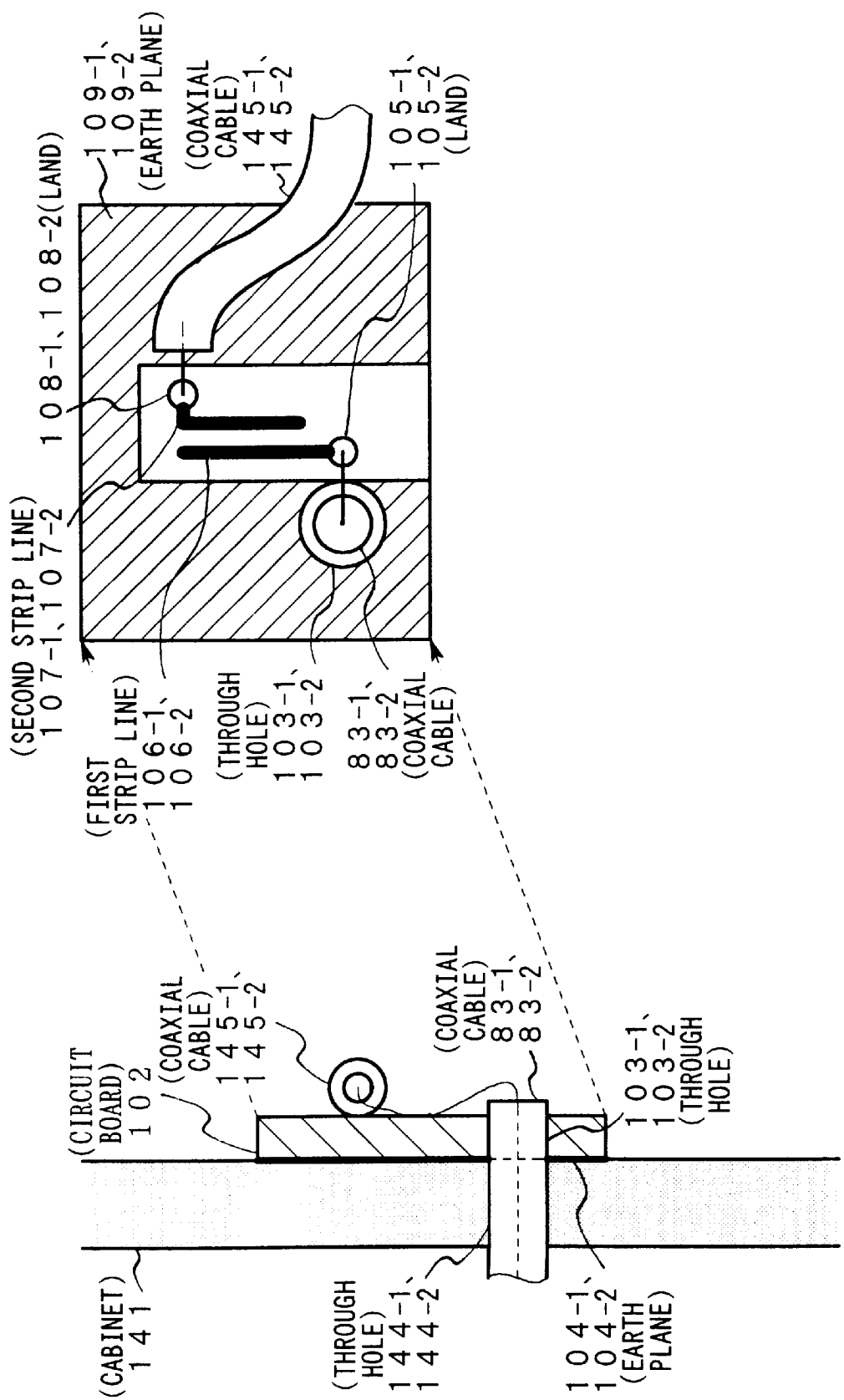
FIG. 11 is a diagram showing the configuration of a coupling module.
Figure 11:
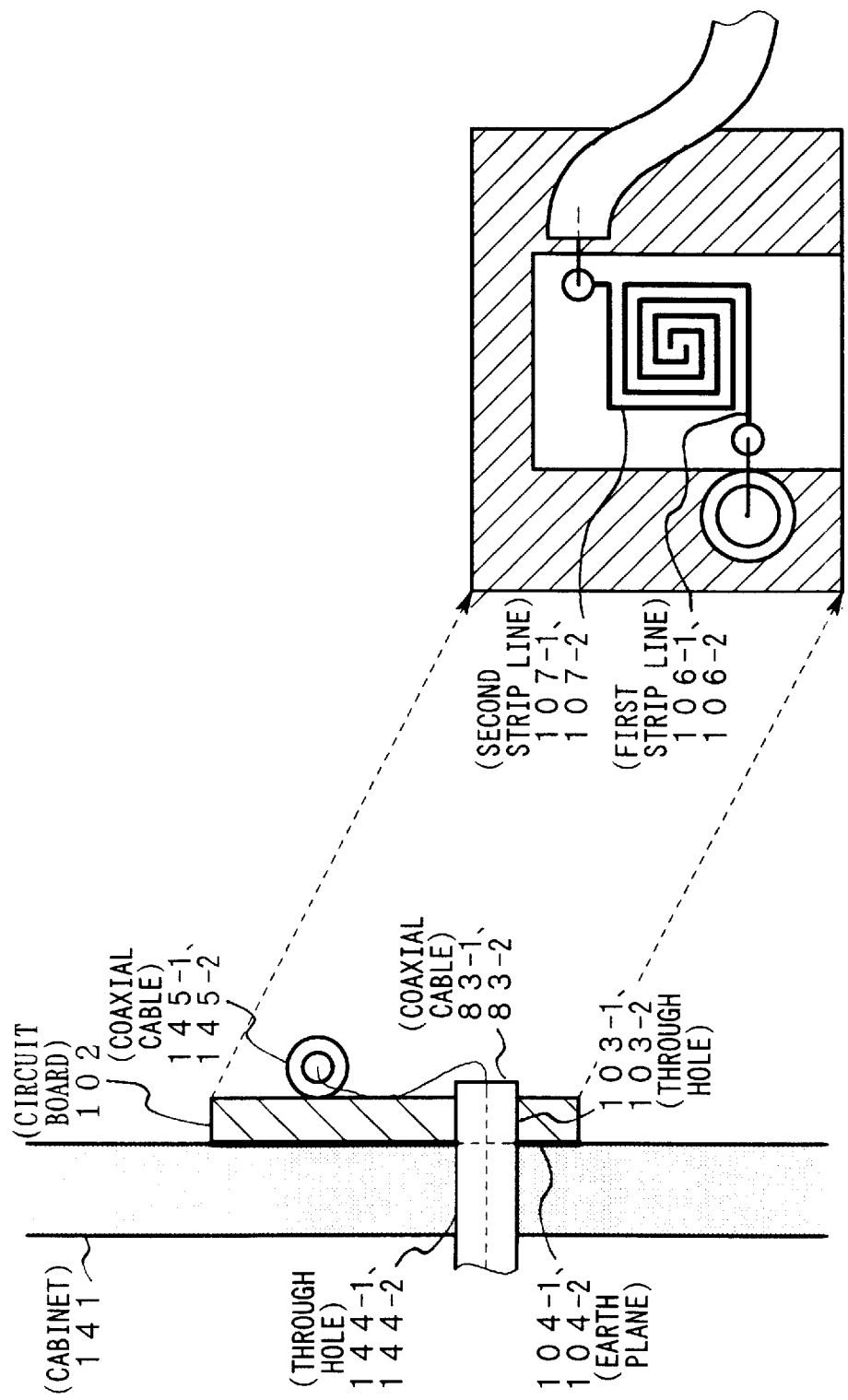

FIG. 11 is a diagram showing a configuration of the coupling module.

In the drawing, the coupling module 101-1 (101-2) forms a passive circuit formed on a circuit board 102-1 (102-2) as described afterward as shown in FIG. 11(a).

A through hole 103-1 (103-2) is formed on the circuit board 102-1 (102-2) so to interlock with the through hole 144-1 (144-2). Among conductor sides of the circuit board 102-1 (102-2), an earth plane 104-1 (104-2) is formed on one of the conductor side which is to be adhered to the interior wall of the cabinet 141. On the other conductor side of the circuit board 102-1 (102-2), a land 105-1 (105-2) disposed in the vicinity of the through hole 103-1 (103-2), the first strip line 106-1 (106-2) ranging from the land 105-1 (105-2), the second strip line 107-1 (107-2) disposed in parallel to the first strip line 106-1 (106-2), a land 108-1 (108-2) connected to one end of the second strip line 107-1 (107-2), and an earth plane 109-1 (109-2) which is disposed in the vicinity of the lands 105-1 (105-2) and 108-1 (108-2) and connected to the earth plane 104-1 (104-2) via a through hole (not shown) are formed.

One end of the coaxial cable 83-1 (83-2) is led into the inner chamber 141A through the through holes 144-1 (144-2) and 103-1 (103-1 (103-2); the inner and outer conductors of the coaxial cable 83-1 (83-2) are respectively soldered to the land 105-1 (105-2) and the region adjacent to the land 105-1 (105-2) in the earth plane 109-1 (109-2). Moreover, the inner and outer conductors at the other end of the coaxial cable 145-1 (145-2) are respectively soldered to the land 108-1 (108-2) and the region adjacent to the land 108-1 (108-2) in the earth plane 109-1 (109-2).

The correspondences of this embodiment to the components shown in FIG. 3 and FIG. 5 are the same as those in the embodiment shown in FIG. 7 except that the coupling modules 101-1 and 101-2 correspond to the coupling means 32 and 43, the coaxial cables 83-1 and 83-2 correspond to the conductor 42, and the land 105-1 (105-2) and the first strip line 106-1 (106-2) correspond to the devices 31 and 41.

Operations of this embodiment will be described with reference to FIG. 10 and FIG. 11.

In this embodiment, the coaxial cable 83-1 and the coaxial cable 145-1 are statically coupled through a stray capacitance formed between the first strip line 106-1 which is connected to the inner conductor of the coaxial cable 83-1 through the land 105-1 and the second strip line 107-2 which is connected to the inner conductor of the coaxial cable 145-1 through the land 108-1.

The coaxial cable 83-2 and the coaxial cable 145-2 are statically coupled through a stray capacitance formed between the first strip line 106-2 which is connected to the inner conductor of the coaxial cable 83-2 through the land 105-2 and the second strip line 107-2 which is connected to the inner conductor of the coaxial cable 145-2 through the land 108-2.

These stray capacitances are all formed in the same way as the radio transmission path in the embodiment shown in FIG. 7 without the presence of the "medium having a high thermal conductivity" such as the inner and outer conductors of the coaxial cables 145-1 and 145-2, so heat quantity to be heat exchanged by the cold head 142 under control of the refrigerating machine 147 is decreased, and the desired performance is maintained in a stable condition as long as a thermal conductivity and a loss of the dielectric unique to the circuit board 102 are tolerably small.

In this embodiment, the transmission of signals between the circuit disposed outside of the cabinet 141 and the electronic part 143 is achieved by static coupling.

Therefore, this embodiment can be achieved even when an occupied band of the signals are distributed only in a frequency band lower than the radio frequency band or includes such a low frequency band.

Moreover, this embodiment uses the stray capacitance formed between the first strip line 106-1 (106-2) and the second strip line 107-1 (107-2) formed on the circuit board 102-1 (102-2), but may use a discrete part as a capacitor instead of such stray capacitances as long as the static coupling is performed with a tolerably small loss in a desired band.

In this embodiment, the transmission path of the signals between the circuit disposed outside of the cabinet 141 and the electronic part 143 is achieved through a static coupling path having loose thermal coupling, but it is not limited to the static coupling, and as long as desired transfer characteristics in the occupied band of these signals can be obtained, the first strip line 106-1 (106-2) and the second strip line 107-1 (107-2) may be formed as a pair of inductors to make mutually close inductive coupling as shown in FIG. 11(b) for example.

Moreover, in this embodiment, the first strip line 106-1 (106-2) is formed together with the second strip line 107-1 (107-2) on the circuit board 102 and disposed in the inner chamber 141A, but the device corresponding to the first strip line 106-1 (106-2) may be disposed outside of the cabinet 141 as long as the transmission of the signals can be achieved securely by both or either of the static coupling and the inducting coupling.

Figure 12:
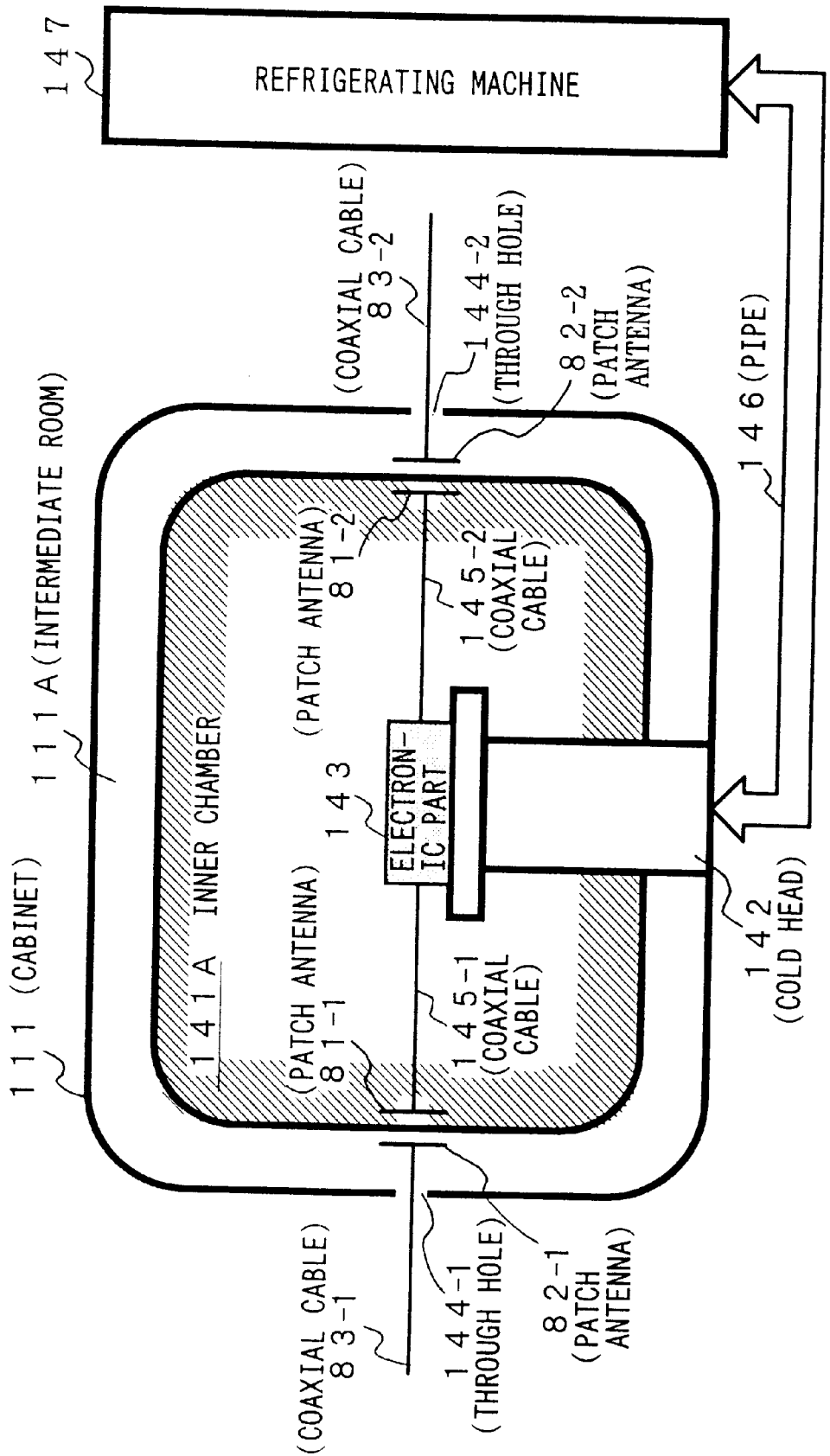
FIG. 12 is a diagram showing the third embodiment according to the present invention.

FIG. 12 is a diagram showing the third embodiment of the present invention.

In the drawing, parts having the same functions and configurations as those shown in FIG. 7 are designated by the same reference numerals and their descriptions are omitted.

Differences of the configuration between this embodiment and the embodiment shown in FIG. 7 are that a cabinet 111 is used instead of the cabinet 141, an intermediate room 111A is formed between the outside of the cabinet 111 and an inner chamber 141A by the cabinet 111, and patch antennas 82-1 and 82-2 are disposed in the intermediate room 111A.

The correspondences of this embodiment to the components shown in FIG. 1 and FIG. 2 are the same as the correspondences in the embodiment shown in FIG. 7 or FIG. 10 except that the partition formed by the cabinet 111 between the inner chamber 141A and the intermediate room 111A corresponds to the partitions 51-1 to 51-N.

Operations of this embodiment will be described with reference to FIG. 12.

In this embodiment, since the intermediate room 111A is present between the inner chamber 141A and the outside of the cabinet 111, heat quantity to be heat exchanged through the cold head 142 under control of the refrigerating machine 147 is decreased and the weight is lightened the higher the level of the thermal conductivity the intermediate room 111A has as compared with the level of the thermal conductivity of a member configuring the cabinet 111.

Furthermore, this embodiment has the patch antennas 82-1 and 82-2 disposed in the intermediate room 111A formed as a heat insulation layer of the inner chamber 141A.

Therefore, a dielectric and other members to be mounted between the patch antennas 82-1 and 82-2 and the patch antennas 81-1 and 81-2 can be a variety of members suitable for environmental conditions (including mediums) of either the inner chamber 141A or the intermediate room 111A.

In this embodiment, the patch antennas 82-1 and 82-2 are disposed in the intermediate room 111A. But by these patch antennas 82-1 and 82-2 being disposed together with the patch antennas 81-1 and 81-2 in the inner chamber 141A, the length of coaxial cables 145-1 and 145-2 from the feeding points of the patch antennas 81-1 and 81-2 to the input and output terminals of the electronic part 143 is shortened in the same way as in the embodiment shown in FIG. 10, and overall input-output characteristics of the electronic part 143 or flexibility of arranging the layout in the inner chamber 141A may be improved.

This embodiment also forms a single intermediate room 111A between the inner chamber 141A and the outside of the cabinet 111, but when the volume of the cabinet 111 is allowed to increase and the mechanical strength can be secured, stabilizing the operating temperature of the electronic part 143 and decreasing heat quantity to be heat exchanged in order to keep the operating temperature can be done by a plurality of intermediate rooms being formed as outer layers of the inner chamber 141A.

Figure 13:
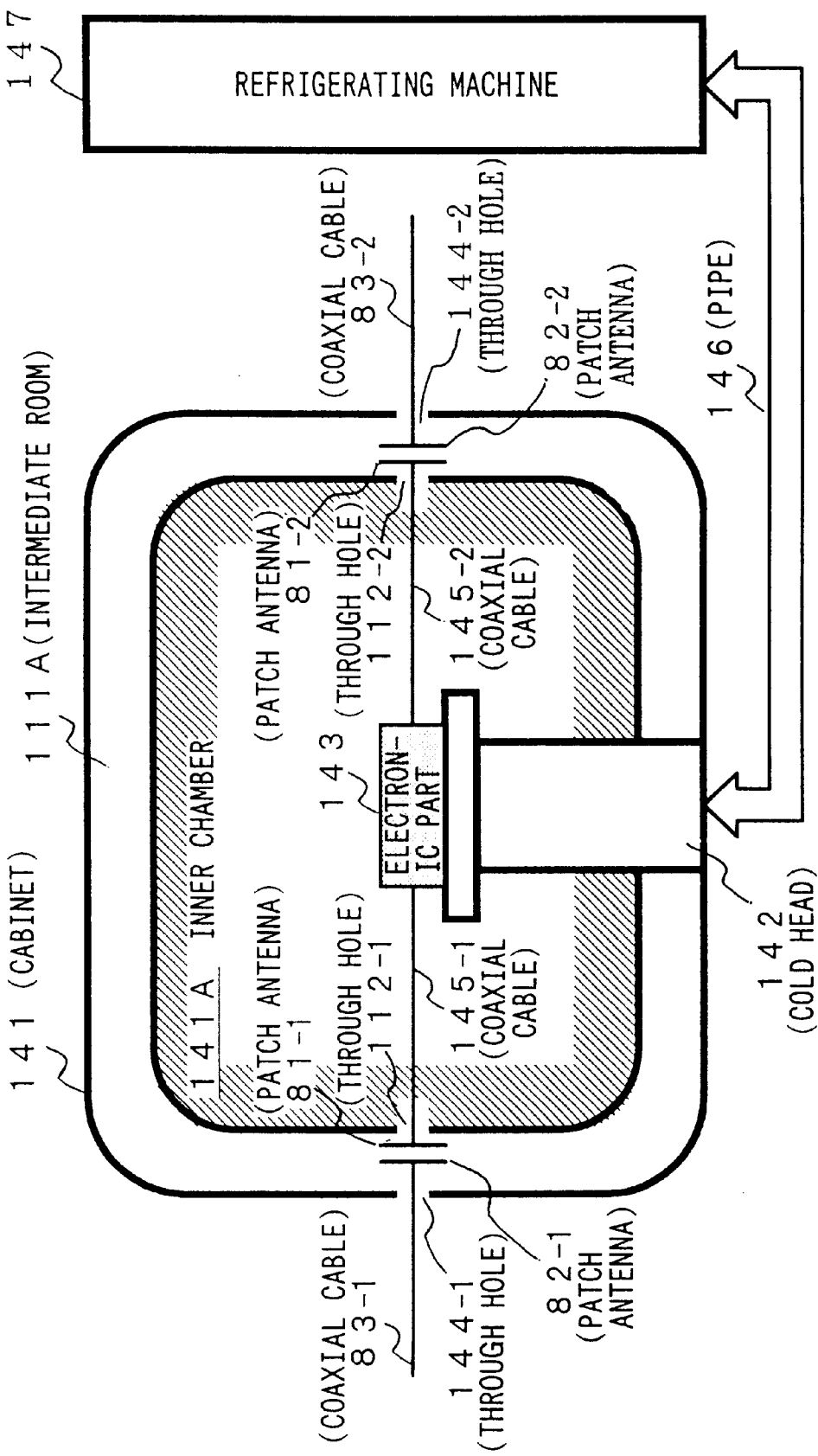
FIG. 13 is a diagram showing the fourth embodiment according to the present invention.

FIG. 13 is a diagram showing the fourth embodiment of the present invention.

In the drawing, parts having the same functions and configurations as those shown in FIG. 12 are designated by the same reference numerals and their descriptions are omitted.

Differences between the configurations of this embodiment and that shown in FIG. 12 are that the patch antennas 81-1 and 81-2 are disposed together with the patch antennas 82-1 and 82-2 in the intermediate room 11A, through holes 112-1 and 112-2 are formed between the intermediate room 111A and the inner chamber 141A, and coaxial cables 145-1 and 145-2 are respectively connected to the feeding points of the patch antennas 81-1 and 81-2 through the through holes 112-1 and 112-2.

The correspondences of this embodiment to the components shown in FIG. 1 and FIG. 2 is the same as the correspondences in the embodiment shown in FIG. 7.

Operations of this embodiment will be described with reference to FIG. 13.

In this embodiment, all the patch antennas 81-1, 81-2, 82-1, and 82-2 are disposed in the intermediate room 111A, so restriction, which is imposed in order to fulfill adaptability to the environmental conditions (including mediums) of the inner chamber 141A, is eased on the members (including mechanisms and members used for mounting) configuring the patch antennas 81-1, 81-2, 82-1, and 82-2 and dielectrics mounted between the patch antennas 81-1 and 81-2 and between the patch antennas 82-1 and 82-2. Therefore, it becomes possible to improve performance and reliability as well as making cost reductions and downsizing.

FIG. 14 is a diagram showing the fifth embodiment of the present invention.

In the drawing, parts having the same functions and configurations as those shown in FIG. 7 are designated by the same reference numerals and their descriptions are omitted.

Differences of the configurations between this embodiment and that shown in FIG. 7 are that a partition 121 which is made of a conductor and externally grounded is formed in an inner chamber 141A and that the inner chamber 141A is divided into two cells 141A-i and 141A-O which respectively include the input and output terminal of an electronic part 143 by the partition 121.

As to the correspondences of this embodiment to the components shown in FIG. 1 and FIG. 2, the partition 121 corresponds to the partitions 51-1 to 51-N, the cells 141A-i and 141A-O correspond to the cells 12A-1 to 12A-n and 62-1 to 62-K, and the input and output terminals of the electronic part 143 correspond to the terminals 61-1 to 61-K.

Operations of this embodiment will be described with reference to FIG. 14.

The inner chamber 141A in which the electronic part 143 is accommodated is divided by the partition 121 into two which are the cells 141A-i and 141A-O where the input terminal and the output terminal of the electronic part 143 are respectively disposed, and the partition 121 is grounded outside of the cabinet 141.

In other words, coupling between the cells 141A-i and 141A-O is set loose by the partition 121.

Therefore, according to this embodiment, degradation of the performance due to the above-described high coupling is eased or prevented even if any of the following items have high values:

(a) the ratio between the level of signals transmitted through the coaxial cable 145-1, and the level of signals transmitted through the coaxial cable 145-2;

(b) the level of radio signals radiated from the outer and inner conductors of the coaxial cables 145-1 and 145-2;

(c) the level of the radio signals, among the radio signals radiated from the patch antennas 82-1 and 81-2, which is reradiated or reflected by the patch antennas 81-1 and 82-2 which are facing each other and then radiated in a direction of other than the patch antennas 81-1 and 82-2.

In this embodiment, the interior wall of the inner chamber 141A is made of non-conductive heat insulating material and ungrounded, but when the isolation between the cell 141A-i and the cell 141A-O must be further improved, for example, a conductive film may be formed on the interior wall by sputtering or other means and grounded together with the partition 121.

Moreover, in this embodiment, the partition 121 is made of a conductor and grounded outside of the cabinet 141.

But, for example, when the electronic part 143 is two-dimensionally disposed in a direction parallel to the top (it is assumed to be a plane for simplification) of the cold head 142 and comprises a plurality of parts sharing predetermined functions and loads, the partition 121 may be formed by a grid-like partitioning member for dividing the inner chamber 141A into a plurality of cells individually corresponding to the above parts, and thermal coupling among these cells may be set loose, thus achieving load and function distribution upon activation, termination, and failure of the refrigerating machine 147, together with securing the desired performance and reliability.

FIG. 15 is a diagram showing the sixth embodiment of the present invention.

In the drawing, parts having the same functions and configurations as those shown in FIG. 7 are designated by the same reference numerals and their descriptions are omitted.

Differences between the configurations of this embodiment and that shown in FIG. 7 are that an electronic part 143 has a casing 131 to cover its outer surface, and coaxial cables 145-1 and 145-2 which are respectively connected to the input and output terminal of the electronic part 143 are pierced through the casing 131.

Correspondences of this embodiment to the components shown in FIG. 1 to FIG. 5 are the same as the correspondences in the embodiment shown in FIG. 7 except that the casing 131 corresponds to the casing 11A.

Operations of this embodiment will be described with reference to FIG. 15.

In this embodiment, a cell 131A for covering the electronic part 143 by the casing 131 is formed as a heat insulating layer in an inner chamber 141A.

As long as one of the ends of the coaxial cables 145-1 and 145-2 respectively are connected to the input terminal and the output terminal of the electronic part 143 and extended outside of the casing 131, heat quantity to be the heat exchanged through the cold head 142 is decreased and the operating temperature is maintained in a stable condition in a heat protection configuration achieved by the inner chamber 141A and the cell 131A formed in duplex structure with respect to the outside of the cabinet 141.

Moreover, in this embodiment, the electronic part 143 is easily fitted without being removed from the casing 131 and operates in a stable condition without having its characteristics and performance unnecessarily deteriorated in due to the removal as long as the coaxial cables 145-1 and 145-2 are previously extended to the outside of the casing 131 or one of the ends of the cables 145-1 and 145-2 are connected to the corresponding input and output terminals via through holes or notches formed on the casing 131.

Therefore, according to the embodiment, by the casing 131 unique to the electronic part 143 being effectively used, the operating temperature and performance of the electronic part 143 are maintained high inexpensively.

The seventh embodiment of the present invention will be described with reference to FIG. 7.

The patch antennas 81-1 and 81-2 are configured as a microstrip antenna (MSA) which has the maximum gain in the occupied bands of the signals to be given to the input terminal and the signals to be output through the output terminal of the electronic part 143.

And, the coaxial cables 145-1 and 145-2 have their length and characteristic impedance determined previously to configure a reactive element having the maximum overall gain in the above-described occupied band by combining input impedance and output impedance of the electronic part 143.

In other words, in the precedent stage and the subsequent stage of the electronic part 143, filters are formed as a combination of the coaxial cable 83, the patch antennas 82-1 and 81-2 and the coaxial cable 145-1 and a combination of the coaxial cable 145-2, the patch antennas 81-2 and 82-2 and the coaxial cable 83-2 and respectively restrict the bands of the input and output signals to the occupied bands of these signals.

Therefore, according to this embodiment, the components of the input signals which may be unnecessarily processed by the electronic part 143 and spurious and other undesired components among the components of the output signals are suppressed, and the signal-to-noise ratio and performance are improved.

In the respective embodiments described above, the cryostat to keep the operating temperature of the electronic part 143 at a cryogenic temperature under control of the refrigerating machine 147 connected through the pipe 146 is configured. But, the present invention is not limited to such a cryostat but can also be applied to, for example, a thermostatic chamber keep the operating temperature of the electronic part 143 at a desired temperature even in an environment that the temperature outside of the cabinet 141 is variable.

Besides, in the respective embodiments described above, the heat is exchanged between liquid helium circulating through the pipe 146 under control of the refrigerating machine 147 and the inner chamber 141A and the electronic part 143 mounted on the top of the cold head 142.

But, when "thermal conductivity where the operating temperature of the electronic part 143 is maintained in a desired range under the distribution of the outside temperature" can be obtained between the outside of the cabinets 111, 141 and the inner chamber 141A with the material, shape and size of the cabinets 111 and 141, the described heat exchange may not be performed at all, a simple post can be provided instead of the cold head 142, and the pipe 146 and the refrigerating machine 147 may be omitted.

Furthermore, in the respective embodiments described above, the interior of the inner chamber 141A is maintained under vacuum in order to prevent dewfall, but the interior of the inner chamber 141A need not be maintained under vacuum or may be filled with gas or other mediums when the relation in size or difference between the operating temperature adapted to the electronic part 143 and the outside temperature of the cabinet 141 is appropriate.

In addition, in the embodiments described above, the cabinets 111 and 141 are made of a non-conductive heat insulating material but may be made of conductors when the inner chamber 141A or the electronic part 143 is required to be electromagnetically shielded from the outside with the desired thermal conductivity secured.

Besides, in the respective embodiments described above, the cabinets 111 and 141 are formed in a substantial rectangular box shape, but, when the electromagnetic shielding against the outside is not required or even if it is required, the cabinets 111 and 141 may be made of conductors or heat insulating materials having a polyhedral or cylindrical shape with an opening formed on a desired side when operated with the opening sealed with a conductor by being housed in a rack, shelf or other cabinets.

And, in the respective embodiments described above, the coaxial cables 145-1 and 145-2 with an inner conductor suitable for unbalanced transmission are connected to the input and output terminals of the electronic part 143. But, a coaxial cable with two inner conductors may be used when the input and/or output terminal(s)is/are suitable for balanced transmission. And, a single inner conductor cable may be used when radiation to the inner chamber 141A or inductive or static coupling of the inner chamber 141A is permissible like a digital transmission line with low impedance is.

Furthermore, the present invention is not limited to the embodiments described above, and a variety of types of embodiments can be applied and all or part of the components may be changed in any way without departing from the spirit and scope of the present invention.

What is claimed is:

1. A heat insulation chamber, comprising:
   a cabinet which forms an inner chamber for accommodating an electronic part, said cabinet made of heat insulating material; and
   coupling means that is disposed in said inner chamber or said cabinet, connected to said electronic part and forms a radio transmission path to an antenna disposed outside of said cabinet.

2. A heat insulation chamber according to claim 1, wherein:
   said cabinet forms a partition between said outside and said inner chamber for accommodating said electronic part; and
   said coupling means is disposed together with said electronic part in said inner chamber.

3. A heat insulation chamber according to claim 1, wherein:
   said cabinet forms a partition between said outside and said inner chamber for accommodating said electronic part; and
   said coupling means is disposed in a region sandwiched between an outer wall of said cabinet and an interior wall of said inner chamber.

4. A heat insulation chamber according to claim 1, wherein said inner chamber is formed as an aggregate of a plurality n of cells respectively including subdomains which are formed by dividing a region where said electronic part is to be mounted.

5. A heat insulation chamber according to claim 1, wherein:
   said coupling means is configured as an aggregate of a plurality K of coupling means which are individually connected to a plurality K of terminals of said electronic part and disposed in said inner chamber; and
   said inner chamber is formed as an aggregate of a plurality K of cells having pairs of said plurality K of terminals and said plurality K of coupling means individually disposed and is divided by a conductor which is grounded outside.

6. A heat insulation chamber according to claim 1, wherein said coupling means has a filtering characteristic which has a pass band in an occupied band of signals to be transmitted between said electronic part and the outside through said coupling means.

7. A thermostatic chamber, comprising:
   a cabinet which forms an inner chamber for accommodating an electronic part, said cabinet made of heat insulating material;
   coupling means that is disposed in said inner chamber or said cabinet, connected to said electronic part and forms a radio transmission path to an antenna disposed outside of said cabinet; and
   a heat exchanging means that performs heat exchange with said inner chamber formed in the cabinet under control of a thermoregulator which maintains an operating temperature of the electronic part accommodated into said cabinet.

8. A cryostat, comprising:
   a cabinet which forms an inner chamber for accommodating an electronic part, said cabinet made of heat insulating material;

coupling means that is disposed in said inner chamber or said cabinet, connected to said electronic part and forms a radio transmission path to an antenna disposed outside of said cabinet; and a heat exchanging means that performs heat exchange with said inner chamber formed in the cabinet under control of a thermoregulator which maintains cryogenic temperature that the electronic part accommodated in said cabinet is to operate at.

9. A cabinet capable of maintaining its inside at a predetermined temperature, for accommmodating an electronic part which operates at said predetermined temperature, comprising:

first coupling means that is connected to an external electric circuit;

second coupling means that is disposed in the inside of said cabinet, is connected to said electronic part, and forms a coupling path to said first coupling means, without directly connecting with said first coupling means; and an inner chamber for accommodating said electronic part formed in the cabinet's inside, the inner chamber being capable of being maintained at said predetermined temperature.

10. A cabinet capable of maintaining its inside at a predetermined temperature, for accommodating an electronic part which operates at said predetermined temperature, comprising:

first coupling means that is connected to an external electric circuit, second coupling means that is disposed in the inside of said cabinet, is connected to said electric part, and forms a coupling path to said first coupling means, without directly connecting with said first coupling means, and an inner chamber for accommodating said electronic part formed in the cabinet's inside, the inner chamber being capable of being maintained at said predetermined temperature, wherein:

said first coupling means is an antenna disposed outside of cabinet;

said second coupling means is an antenna disposed in the inside of said cabinet; and said coupling path is a radio transmission path formed between the two antennas.

11. A cabinet capable of maintaining its inside at a predetermined temperature, for accommodating an electronic part which operates at said predetermined temperature, comprising;

first coupling means that is connected to an external electric circuit, second coupling means that is disposed in the inside of said cabinet, is connected to said electric part, and forms a coupling path to said first coupling means without directly connecting with said first coupling means, and an inner chamber for accommodating said electronic part formed in the cabinet's inside, the inner chamber being capable of being maintained at said predetermined temperature, wherein:

said first and second coupling means are each an antenna disposed in the inside of said cabinet; and said coupling path is a radio transmission path formed between the two antennas.

12. A cabinet capable of maintaining its inside at a pretermined temperature, for accommodating an electronic part which operates at said predetermined temperature, comprising:

first coupling means that is connected to an external electric circuit, second coupling means that is disposed in the inside of said cabinet, is connected to said electric part, and forms a coupling path to said first coupling means, without directly connecting with said first coupling means, and an inner chamber for accommodating said electronic part formed in the cabinet's inside, the inner chamber being capable of being maintained at said predetermined temperature, wherein:

said first and second coupling means are each strip lines on a same circuit board disposed in the inside of said cabinet; and said coupling path is a coupling path formed between the two strip lines, formed for static coupling and/or inductive coupling.

13. A cabinet capable of maintaining its inside at a predetermined temperature, for accommodating an electronic part which operates at said predetermined temperature, comprising:

first coupling means that is connected to an external electric circuit, second coupling means that is disposed in the inside of said cabinet, is connected to said electric part, and forms a coupling path to said first coupling means, without directly connecting with said first coupling means, and an inner chamber for accommodating said electronic part formed in the cabinet's inside, the inner chamber being capable of being maintained at said predetermined temperature, wherein:

said first coupling means is a strip line disposed on a circuit board;

said second coupling means is a strip line on said circuit board disposed in the inside of said cabinet; and said coupling path is a coupling path formed between the two strip lines, formed by static coupling and/or inductive coupling.

14. A cabinet according to claim 9, wherein said cabinet is made of heat insulating material; and said first coupling means, comprising:

an antenna that is disposed in said inner chamber or said cabinet; and a feeder which leads the feeding point of said antenna to the outside of said cabinet; wherein said second coupling means having a feeding point which is connected to said electronic part and forms a radio transmission path to said antenna.

15. A cabinet according to claim 9, wherein said cabinet is made of heat insulating material; and said second coupling means forms a coupling path with said external circuit disposed outside of said cabinet by static coupling and/or inductive coupling.

16. A cabinet according to claim 9, wherein said cabinet is made of heat insulating material; and said first coupling means, comprising:

a device that is disposed in said inner chamber or said cabinet;

a conductor which leads the terminal of said device to the outside of said cabinet; wherein said second coupling means forms a coupling path with said device by static coupling and/or inductive coupling.

* * * * *